United States Patent
Kotov et al.

(10) Patent No.: US 12,216,043 B2
(45) Date of Patent: Feb. 4, 2025

(54) DEVICES AND METHODS FOR DETERMINING CHIRAL OPTICAL PROPERTIES FROM THIRD HARMONIC MIE SCATTERING OF SEMICONDUCTOR NANOHELICES

(71) Applicants: The Regents of The University of Michigan, Ann Arbor, MI (US); University of Bath, Bath (GB)

(72) Inventors: Nicholas A. Kotov, Ypsilanti, MI (US); Ventsislav Valev, Bath (GB); Lukas Ohnoutek, Zlin (CZ); Ji-Young Kim, Ann Arbor, MI (US)

(73) Assignees: The Regents of The University of Michigan, Ann Arbor, MI (US); University of Bath, Bath (GB)

(*) Notice: Subject to any disclaimer, the term of this patent is extended or adjusted under 35 U.S.C. 154(b) by 0 days.

(21) Appl. No.: 18/715,339

(22) PCT Filed: Dec. 1, 2022

(86) PCT No.: PCT/US2022/051531
§ 371 (c)(1),
(2) Date: May 31, 2024

(87) PCT Pub. No.: WO2023/102112
PCT Pub. Date: Jun. 8, 2023

(65) Prior Publication Data
US 2024/0418632 A1 Dec. 19, 2024

Related U.S. Application Data

(60) Provisional application No. 63/284,813, filed on Dec. 1, 2021.

(51) Int. Cl.
*G01N 21/21* (2006.01)
*G01N 21/19* (2006.01)
*G01N 21/47* (2006.01)

(52) U.S. Cl.
CPC .............. *G01N 21/21* (2013.01); *G01N 21/19* (2013.01); *G01N 21/47* (2013.01); *G01N 2021/216* (2013.01)

(58) Field of Classification Search
CPC ...... G01N 21/19; G01N 21/21; G01N 21/211; G01N 21/23; G01N 21/47; G01N 2021/213; G01N 2021/216; G01N 2021/4792
See application file for complete search history.

(56) References Cited

U.S. PATENT DOCUMENTS 9,562,855 B1 * 2/2017 Yoon ................ G01N 33/54373
11,204,319 B2 * 12/2021 Dholakia ........... G01N 21/6458
(Continued)

FOREIGN PATENT DOCUMENTS

WO WO-2013080505 A1 * 6/2013 ........... G01N 21/648

OTHER PUBLICATIONS

Kamandi et al., "Enantio-specific Detection of Chiral Nano-Samples Using Photo-induced Force", Phys.Rev., Dec. 11, 2017, vol. 8, pp. 1-16.
(Continued)

*Primary Examiner* — Gordon J Stock, Jr.
(74) *Attorney, Agent, or Firm* — Harness, Dickey & Pierce, P.L.C.

(57) ABSTRACT

Methods and devices for detecting chiral properties from a sample are provided. Light may be directed towards a sample in contact with a chiral nanoparticle. Third harmonic Mie scattering (THMS) optical activity generated by the chiral nanoparticle in contact with the sample can then be
(Continued)

detected. A device for detecting chiral properties of a sample is also contemplated that includes Nat least one microwell having a volume of ≤about 1 microliter configured to hold a chiral nanoparticle capable of generating third harmonic Mie scattering (THMS) optical activity and a sample to be analyzed. The device includes a source of light configured to generate and direct light toward the at least one microwell containing the chiral nanoparticle and the sample and at least one detector configured to detect third harmonic Mie scattering (THMS) generated by the chiral nanoparticle in the microwell.

19 Claims, 24 Drawing Sheets

(56) References Cited

U.S. PATENT DOCUMENTS

| | | | | |
|---|---|---|---|---|
| 11,499,910 | B2* | 11/2022 | Phal | G01J 3/108 |
| 11,987,737 | B2* | 5/2024 | Marandi | C09K 11/54 |
| 2022/0364982 | A1* | 11/2022 | Dionne | G01N 21/21 |

OTHER PUBLICATIONS

Ohnoutek et al., "Optical Activity in Third-Harmonic Rayleigh Scattering: A New Route for Measuring Chirality", Laser & Photonics Reviews, Sep. 15, 2021, vol. 15, pp. 1-27.

Hu et al., "Enhanced Chiral Mie Scattering by a Dielectric Sphere within a Superchiral Light Field", Physics, Sep. 2, 2021, vol. 3, pp. 747-756.

Shcherbakov et al., "Nonlinear Interference and Tailorable Third-Harmonic Generation from Dielectric Oligomers", ACS Photonics, Apr. 27, 2015, vol. 2, pp. A-E.

Collins et al., "Chirality and Chiroptical Effects in Metal Nanostructures: Fundamentals and Current Trends", Advanced Optical Materials, Aug. 1, 2017, vol. 5, pp. 1-46.

Yan et al., "Self-Assembly of Chiral Nanoparticles into Semiconductor Helices with Tunable near-Infrared Optical Activity", Chemistry of Materials, Jan. 2020, vol. 32, pp. 476-488.

Gaponik et al., "Thiol-Capping Of CdTe Nanocrystals: An Alternative To Organometallic Synthetic Routes", Journal of Physical Chemistry B, Jun. 2020, vol. 106, pp. 7177-7185.

Feng et al., "Assembly of mesoscale helices with near-unity enantiomeric excess and light-matter interactions for chiral semiconductors", Science Advances, Mar. 1, 2017, vol. 3, pp. 1-12.

Treharne et al., "Optical Design and Fabrication of Fully Sputtered CdTe/CdS Solar Cells", Journal of Physics: Conference Series, Mar. 1, 2011, vol. 286, 012038, 9 pages.

International Search Report and Written Opinion of the International Searching Authority, issued in PCT/US2022/051531, mailed Apr. 6, 2023; ISA/KR.

* cited by examiner

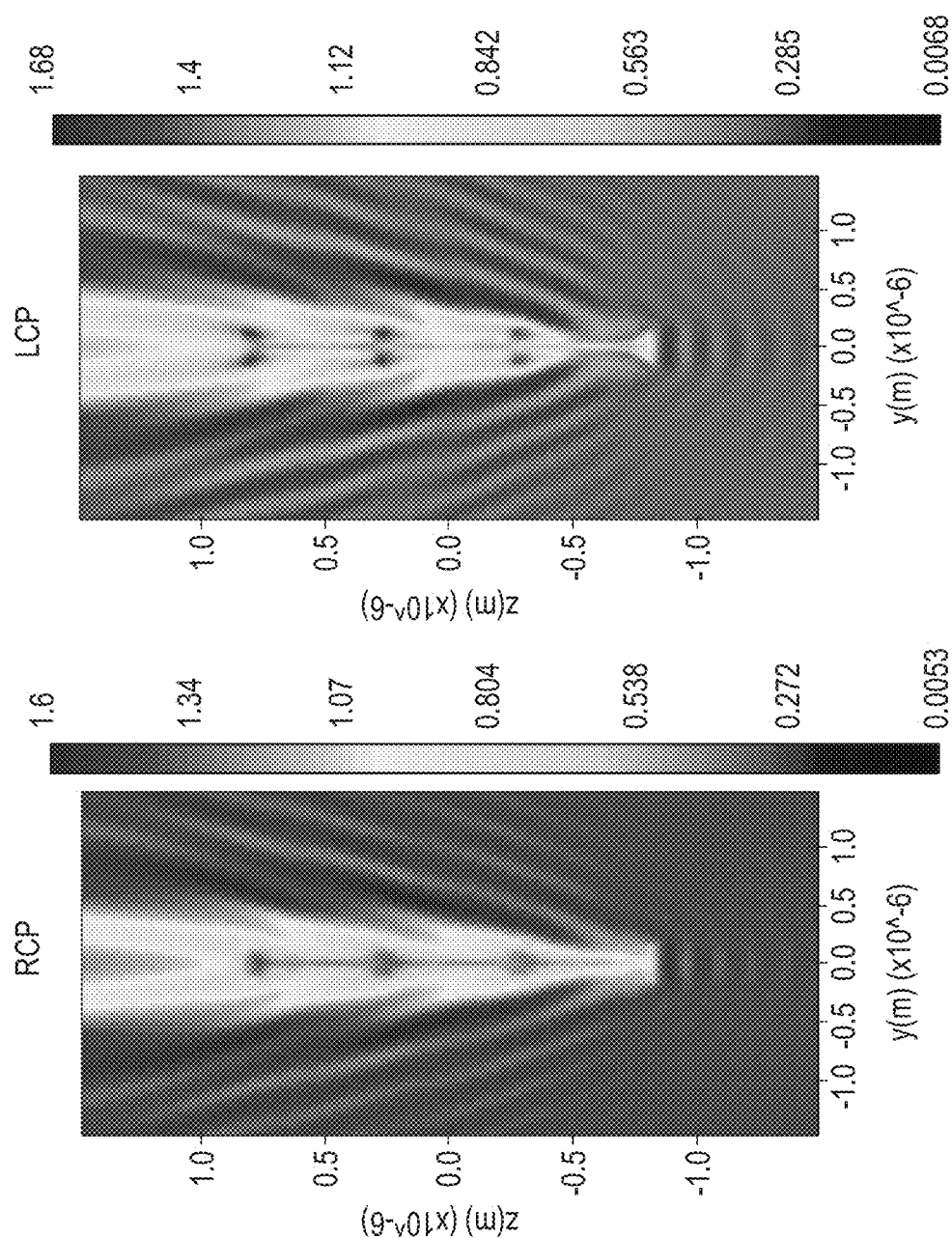
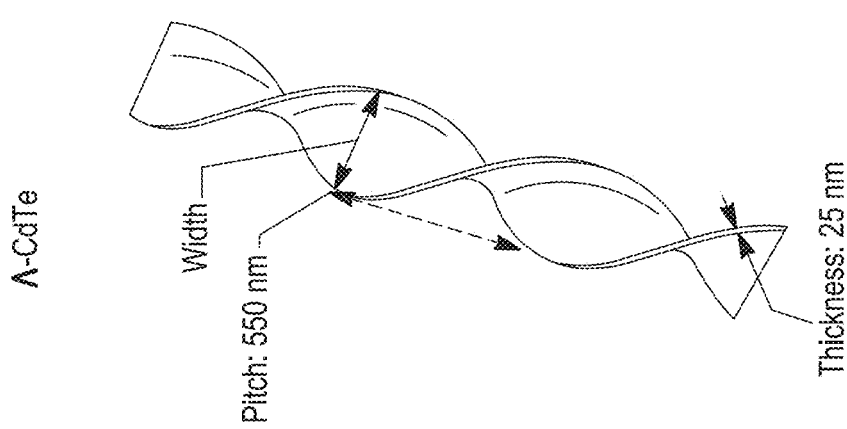
FIG. 2B
FIG. 2A

DEVICES AND METHODS FOR DETERMINING CHIRAL OPTICAL PROPERTIES FROM THIRD HARMONIC MIE SCATTERING OF SEMICONDUCTOR NANOHELICES

CROSS-REFERENCE TO RELATED APPLICATIONS

This application is a 371 U.S. National Phase of International Application No. PCT/US2022/051531, filed on Dec. 1, 2022, which claims the benefit of U.S. Provisional Application No. 63/284,813, filed on Dec. 1, 2021. The entire disclosures of the above applications are incorporated herein by reference.

GOVERNMENT SUPPORT

This invention was made with government support under HQ00342010033 and N0001 4-1 8-1-2876 awarded by the U.S. Office of Naval Research. The Government has certain rights in the invention.

FIELD

The present disclosure relates to devices and methods for determining chiral optical properties from third harmonic Mie scattering of chiral semiconductor nanoparticles.

BACKGROUND

This section provides background information related to the present disclosure which is not necessarily prior art.

Chiroptical spectroscopies provide a new optical dimension and informative datasets for structural analysis of nanostructured particles. Assessment of chiral optical properties in small volumes is an essential task in drug discovery, biomedical sequencing, biotechnologies, and synthesis of materials for photonics. They can be utilized in robotic optimization of nanophotonic materials, but these spectroscopies typically require sample volumes incompatible with generating large chemical libraries. Combinatorial nanochemistry allows tens to millions of mixtures to be produced in a single process, generating large chemical libraries and making possible implementation of artificial intelligence algorithms.

In the advent of rapid development of chiral nanostructures, such synthetic and analytical platforms can be applied for their high throughput assessment as enzyme mimics, contrast agents, antibiotic agents, drug delivery vehicles, as well as other applications of these bioinspired materials. These analyses are often carried out in microplates of 1,536, 3,456 or 9,600 wells with sample volumes as small as, or smaller than, 1 microliter ($\mu L$), but the traditional methods of chiroptical spectroscopy typically require sample volumes that are 100 to 1,000 times larger. As such, there is a need for the development of new optical tools for performing rapid characterization of chiral nanocompounds in ultrasmall volumes. Nonlinear chiroptical spectroscopies can potentially be observed in focal volumes down to tens of cubic micrometers ($\mu m^3$) and are therefore well suited for microplates with even the highest number of wells. Although nonlinear chiroptical effects applicable in isotropic liquids have been reported, they are technologically too complex for the needs of combinatorial nanochemistry and high throughput synthesis.

Thus, the realization of such methods in a format suitable for rapid acquisition of large amounts of data is currently difficult with current implementations of chiroptical spectroscopies, due to the need for relatively large volume of the samples and low light flux. Similar problems emerge for robotic optimization of nanophotonic materials, but these spectroscopies typically require sample volumes incompatible with generating large chemical libraries. New optical tools are needed to characterize chirality for ultrasmall volumes, such as 1 microliter droplets, needed for high-throughput synthetic and analytical stations for chiral compounds.

SUMMARY

This section provides a general summary of the disclosure, and is not a comprehensive disclosure of its full scope or all of its features.

In certain aspects, the present disclosure relates to methods and devices for detecting chiral properties, more specifically to third harmonic Mie scattering (THMS) optical activity, from a sample that is in contact with one or more chiral nanoparticles.

In one variation, a method of detecting chiral properties from a sample is provided. The method may comprise directing light towards a sample in contact with a chiral nanoparticle. The method may also comprise detecting third harmonic Mie scattering (THMS) optical activity generated by the chiral nanoparticle in contact with the sample.

In one aspect, the third harmonic Mie scattering (THMS) optical activity is a third harmonic (TH) emission in the forward direction that is circularly polarized.

In one aspect, the sample has a volume of less than or equal to about 1 microliter.

In one aspect, the sample has a volume of greater than or equal to about $10^{-5}$ microliter to less than or equal to about 1 microliter.

In one aspect, the chiral nanoparticle comprises a semiconductor material.

In one aspect, the chiral nanoparticle comprises cadmium tellurium (CdTe).

In one aspect, the chiral nanoparticle comprises a plurality of chiral nanoparticles self-assembled together to define at least one self-assembled nanostructured helix, such as a plurality of self-assembled nanostructured helices.

In one aspect, the chiral nanoparticle comprises a plurality of chiral nanoparticles assembled together, wherein each chiral nanoparticle is in the form of a nanohelix having a length of greater than or equal to about 5 micrometers to less than or equal to about 8 micrometers and a thickness of greater than or equal to about 10 nm to less than or equal to about 50 nm.

In one aspect, the light is circularly polarized light.

In another variation, a device for detecting chiral properties of a sample is provided. The device may comprise at least one microwell having a volume of less than or equal to about 1 microliter configured to hold a chiral nanoparticle capable of generating third harmonic Mie scattering (THMS) optical activity. The at least one microwell is configured to contain a sample to be analyzed. The device also includes a source of light configured to generate and direct light toward the at least one microwell containing the chiral nanoparticle and the sample. Further, the device includes at least one detector configured to detect third harmonic Mie scattering (THMS) generated by the chiral nanoparticle in the microwell.

In one aspect, the chiral nanoparticle is provided in the sample in the microwell.

In one aspect, the chiral nanoparticle is associated with a surface of the microwell.

In one aspect, the microwell has a volume of greater than or equal to about $10^{-5}$ microliter to less than or equal to about 1 microliter.

In one aspect, the chiral nanoparticle comprises a semiconductor material.

In one aspect, the chiral nanoparticle comprises cadmium tellurium (CdTe).

In one aspect, the chiral nanoparticle comprises a plurality of chiral nanoparticles self-assembled together to define at least one self-assembled nanostructured helix, such as a plurality of self-assembled nanostructured helices.

In one aspect, the chiral nanoparticle comprises a plurality of chiral nanoparticles assembled together. Each chiral nanoparticle is in the form of a nanohelix having a length of about 5 micrometers to about 8 micrometers and a thickness of greater than or equal to about 10 nm to less than or equal to about 50 nm.

In one aspect, the source of light is configured to generate and direct circularly polarized light.

In one aspect, the device further comprises at least one processor.

In one aspect, the at least one microwell comprises an array of microwells.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIGS. 1A-1E show CdTe nanohelices for third harmonic Mie scattering optical activity prepared in accordance with certain aspects of the present disclosure. FIG. 1A shows a schematic diagram of THMS optical activity. Following illumination with left circularly polarized (LCP) light at the wavelength λ, the intensity of THMS light (at λ/3) depends on the handedness of the CdTe nanohelices. FIG. 1B shows scanning electron micrographs (SEM) of the left- and right-handed CdTe nanohelices, indicated as ∧-CdTe and Δ-CdTe respectively. FIG. 1C shows experimental ellipticity spectra and numerically computed differential extinction cross section spectra from the nanohelices, in the linear optical regime. The wavelength of illumination and detection for the THMS experiments are indicated with vertical lines. FIG. 1D shows emission patterns from a ∧-CdTe nanohelix illuminated along the main axis, for LCP and for right circularly polarized light (RCP). FIG. 1E is a diagram of a TH scattering setup. WP: quarter-wave plate; F1: optical filter allows λ; L1: focusing lens; L2: collimating lens; F2: band-pass filter allows only λ/3 through.

FIGS. 2A-2E show electromagnetic simulation for CdTe nanohelices. FIG. 2A shows the geometry of three-dimensional (3D) nanohelix enantiomers model for the electromagnetic computation. FIG. 2B shows an electric field profile map of A-CdTe under full wave (span of 300 nm-1500 nm) RCP (left) and LCP (right) illumination calculated by FDTD method. FIG. 2C shows radiation patterns of A-CdTe oriented perpendicularly to the incident direction of electromagnetic waves. The 3D radiation patterns were obtained from electromagnetic wave with 1095 nm wavelength. FIGS. 2D and 2E show two-dimensional (2D) (x-normal) radiation patterns of A-CdTe oriented parallel (FIG. 2D) and perpendicular (FIG. 2E) to the incident direction of electromagnetic waves. The data were obtained by setting a reference direction as −z, which is the incident direction of electromagnetic waves.

FIGS. 3A-3D show a demonstration of third harmonic Mie scattering (THMS) optical activity. Third harmonic (TH) intensity in the forward direction (through the sample and in a forward direction relative to a light source generating the incident laser light), as a function of incident laser power, at the wavelength λ=1095 nm, for LCP and RCP light, is shown from A-CdTe in FIG. 3A and from A-CdTe in FIG. 3B. The symbols are experimental data points (each is the median from 50 measurements) and the lines are fits to a cubic power-law. A schematic of the experiment is shown as an inset in FIG. 3A. FIG. 3C shows multiphoton forward emission from A-CdTe nanohelices, upon illumination at 1095 nm. The TH signal (at 365 nm) clearly dominates nearby emission wavelengths for linearly polarized, LCP and RCP light. FIG. 3D shows THMS ellipticity, calculated from power dependence curves, as in FIGS. 3A and 3B, from A- and A-CdTe, at three different wavelengths. The chiroptical response is well resolved as demonstrated by the error bars indicating standard deviation.

FIGS. 4A-4D are confirmation of third harmonic Mie scattering (THMS) optical activity. FIG. 4A shows third harmonic (TH) intensity in the right angle direction (in a right angle or perpendicular to a direction of laser light from the light source after it exits the sample), as a function of incident laser power, at the wavelength λ=1095 nm, for LCP and RCP light, from left-handed CdTe nanohelices (∧-CdTe). FIG. 4B shows THMS ellipticity, calculated from power dependence curves, for ∧- and Δ-CdTe, at three different wavelengths. The chiroptical response is well resolved as demonstrated by the error bars (indicating standard deviation). This chiroptical response is opposite to that in FIG. 3D. FIG. 4C shows the TH intensity in the forward direction (through the sample and in a forward direction relative to a light source generating the laser light), as a function of an analyzing quarter-wave plate (AWP) rotation angle for ∧-CdTe. LCP and RCP incident light produces LCP and RCP TH light, respectively. FIG. 4D shows the TH intensity in the 90° direction, as a function of an AWP rotation angle for ∧-CdTe and Δ-CdTe. LCP and RCP incident light produce linearly polarized TH light. All measurements were done for incident 1095-nm light. Schematic diagrams of the experiments are shown in insets.

FIGS. 5A-5E show applications of THMS for characterizing chiral nanostructures in ultrasmall volumes. FIG. 5A shows proof-of-principle data showing that methods according to certain aspects of the present disclosure can clearly differentiate A-CdTe and A-CdTe, in 1 mm thick optical cuvettes (as opposed to standard 1 cm cells). The THMS ellipticity was calculated from power dependence curves measured at three different wavelengths. FIG. 5B shows, in the same 1 mm cuvette, the TH intensity follows a clear cubic dependence as a function of laser power at the wavelength of 1095 nm. Despite the small dimensions of the cuvette, the chiroptical effect for LCP and RCP, respectively, clearly reverses sign with the handedness of the samples, illustrating the potential for applications in tiny volumes. FIG. 5C shows a schematic diagram illustrating an application of the technique according to certain aspects of the present disclosure as analysis tool in parallel combinatorial chemical synthesis. FIG. 5D shows scanning the laser beam in an optical objective allows for high throughput applications—to scope reaction conditions, which generate nanomolar quantities of the desired compound in minuscule volumes (e.g., <1 µL) arrayed across a microplate. The red arrow indicates the direction of incident light. FIG. 5E shows a schematic illustration for in-line reaction monitoring within microreactors.

Figures 8A, 8B, 8C:
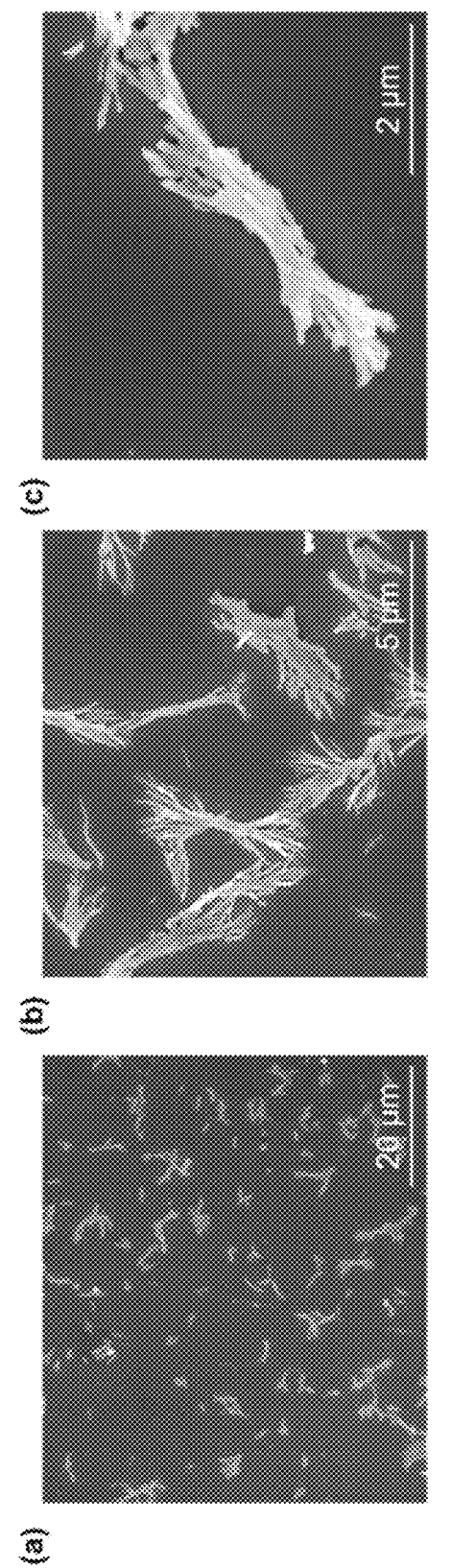
Figures 8D, 8E, 8F:
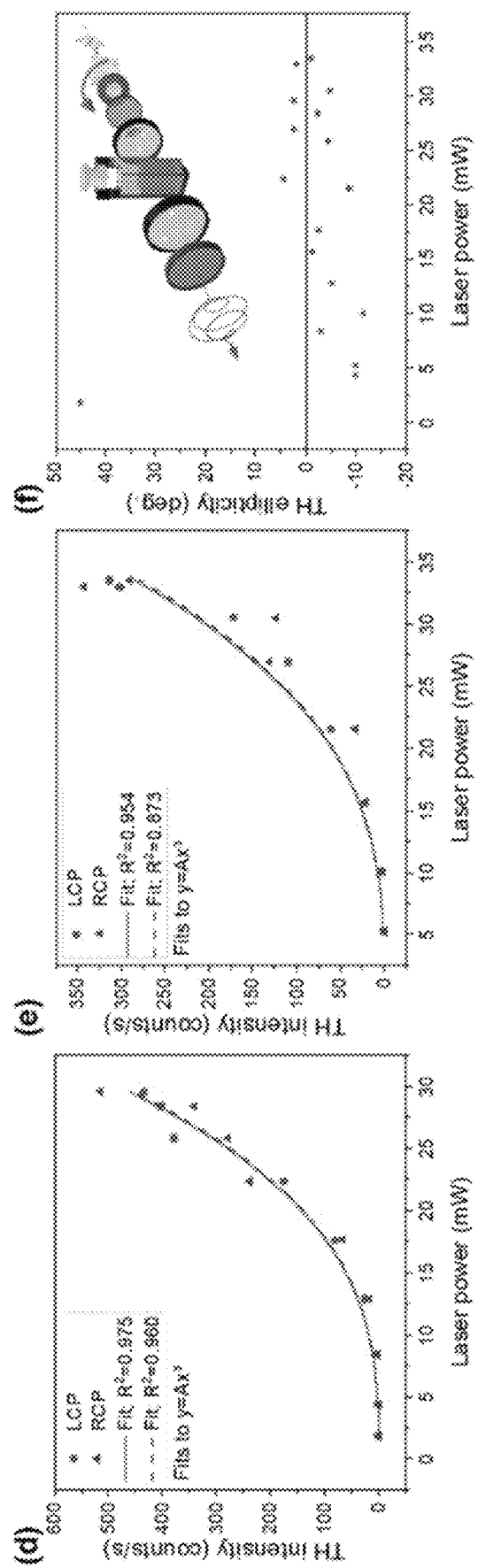
Figure 8G:
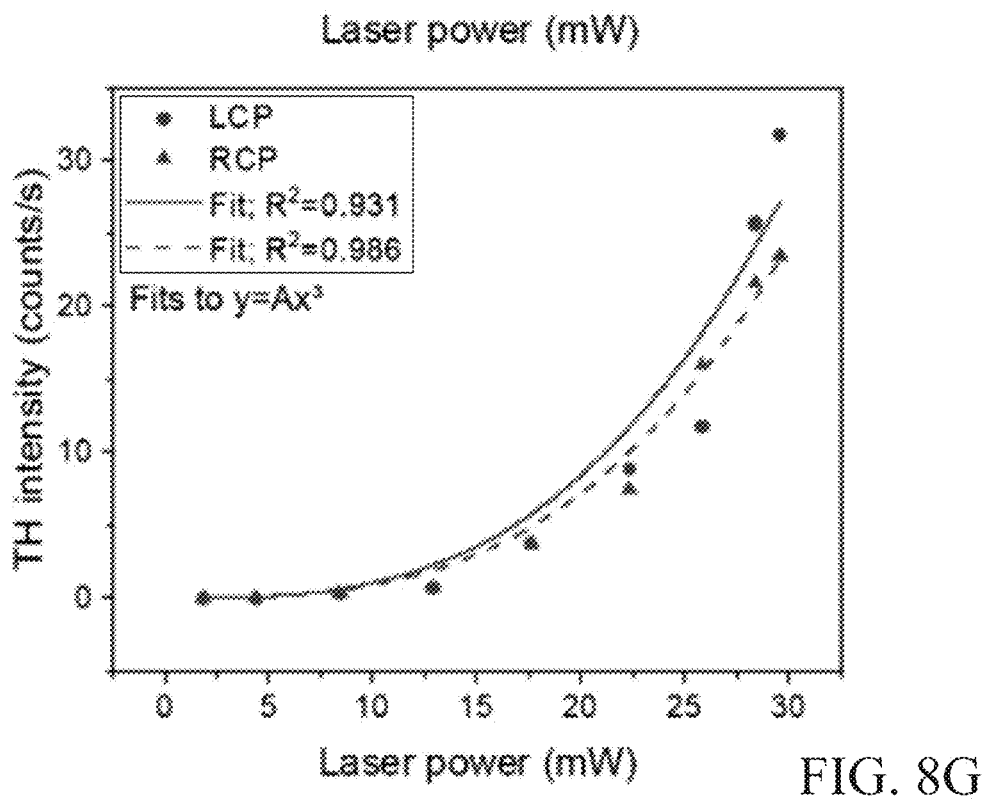
Figure 8H:
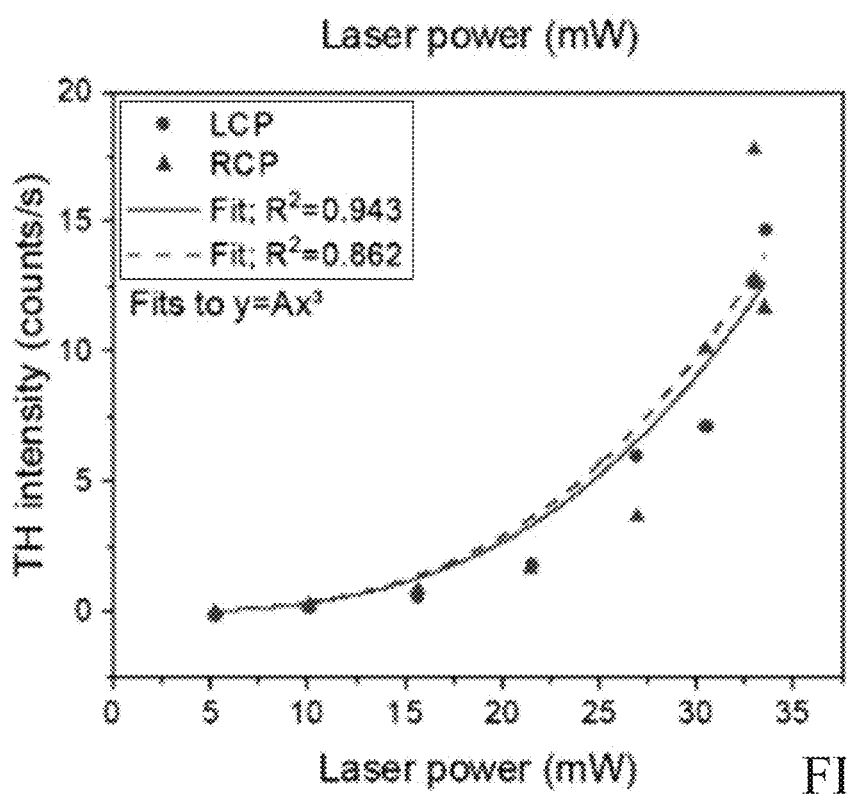
Figure 8I:
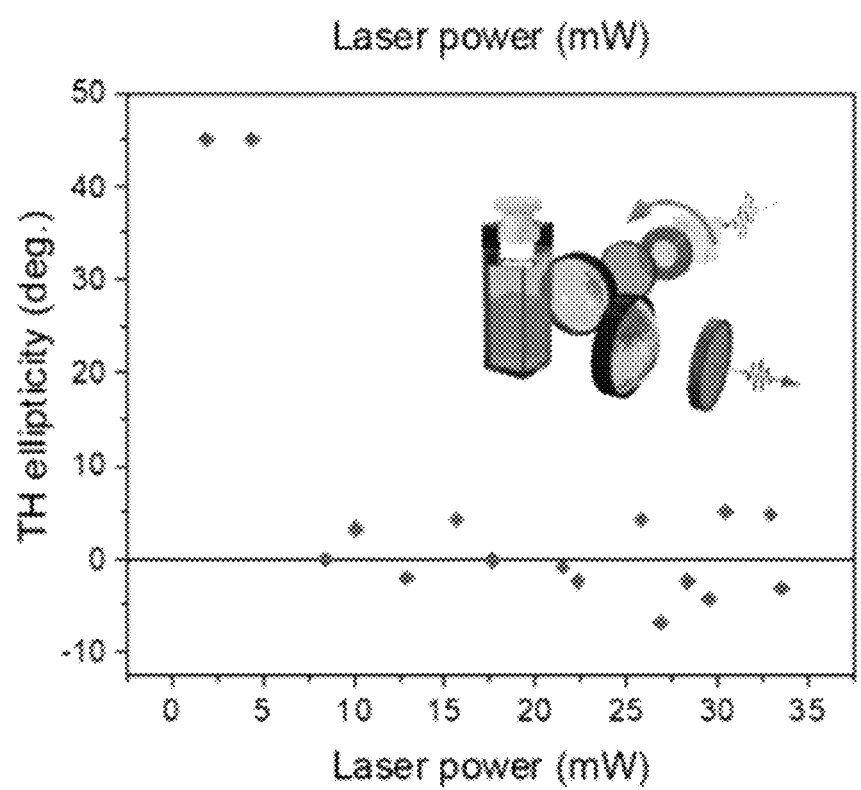

FIGS. 8A-8I show no third harmonic (TH) Mie optical activity observed in the case of comparative achiral CdTe nanoribbons. FIGS. 8A-8C show scanning electron microscopy (SEM) images of CdTe nanoribbons with varying magnification. FIGS. 8D-8E show two measurements of TH intensity as a function of incident power in the forward scattering configuration. FIG. 8F shows TH ellipticity calculated from results in FIGS. 8D and 8E. Inset: schematic of the experimental setup. FIGS. 8G and 8H show two measurements of TH intensity as a function of incident power in the 90° scattering configuration. FIG. 8I show TH ellipticity calculated from results in FIGS. 8G and 8H. Inset: schematic of the experimental setup. In all nonlinear experiments, the incident light is left circularly polarized (LCP) or right circularly polarized (RCP). The samples are illuminated with 1095-nm light. Each data point is a median of 50 measurements. The data sets are fitted with a function of the form $y=Ax^3$.

Figures 9A, 9B:
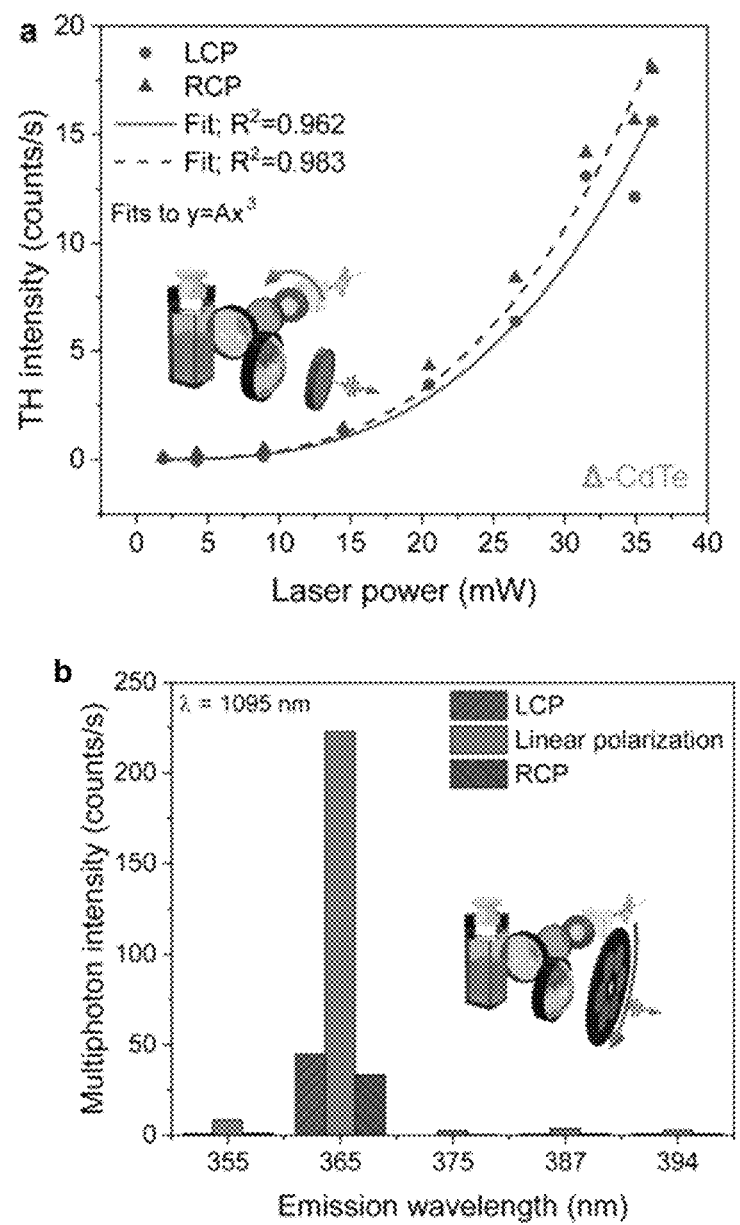

FIGS. 9A-9B show third harmonic hyper Mie scattering optical activity for right-angle scattering. In FIG. 9A, TH intensity is shown in the right angle direction, as a function of incident laser power, at the wavelength ($\lambda$)=1095 nm, for LCP and RCP light, from right-handed CdTe nanohelices (Δ-CdTe). In FIG. 9B, multiphoton right angle emission from Λ-CdTe nanohelices is shown upon illumination at 1095 nm.

Figures 10A, 10B, 10C, 10D:
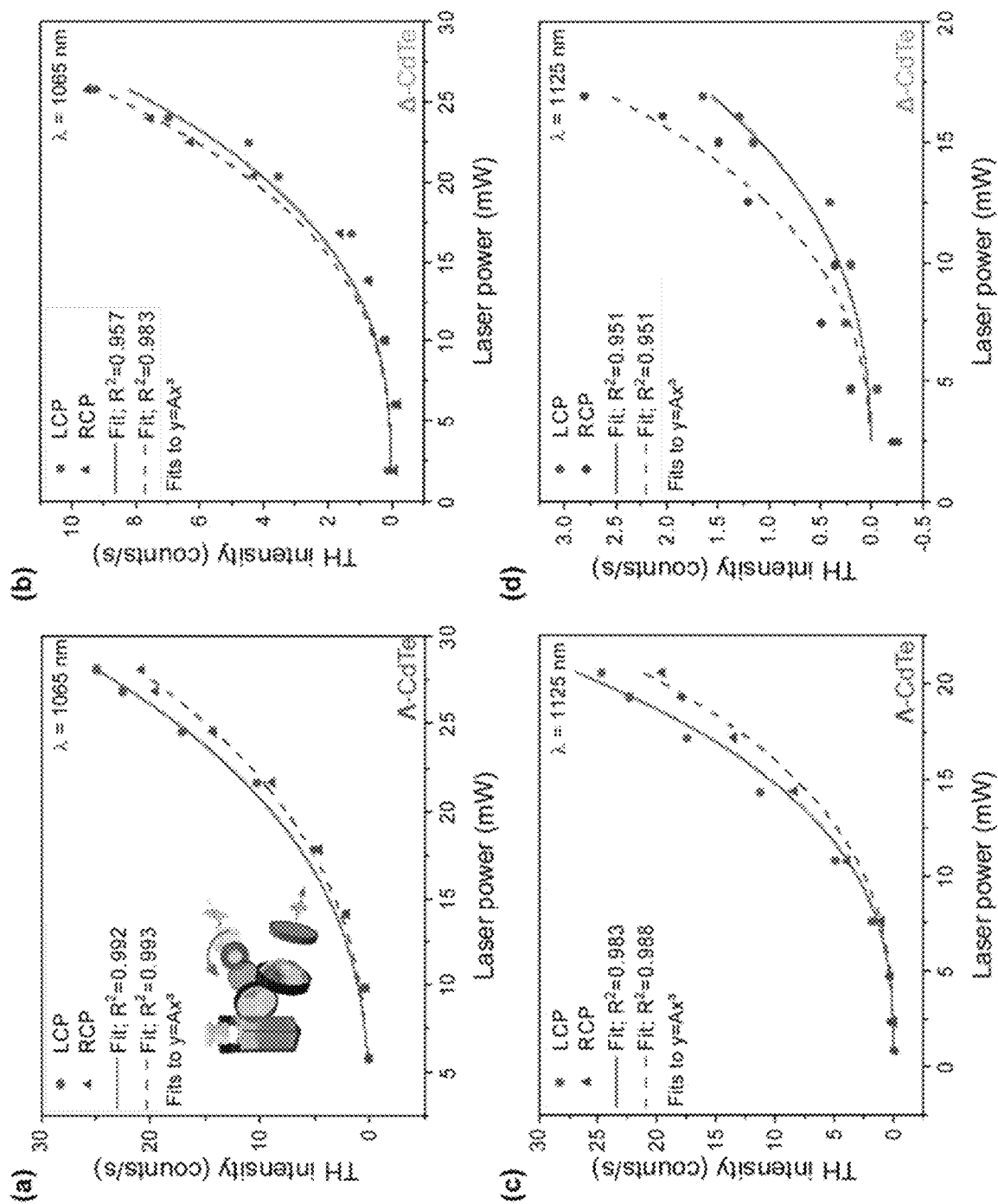

FIGS. 10A-10D show optical activity in third harmonic (TH) Mie right angle scattering at two wavelengths. TH intensity measured at 1065 nm as a function of incident power for FIG. 10A showing Λ-CdTe (with a schematic of the experimental setup in the inset) and FIG. 10B showing Δ-CdTe nanohelices in the right-angle scattering configuration. Similar measurements at 1125 nm are presented in FIG. 10C for Λ-CdTe and FIG. 10D for Δ-CdTe.

Figures 11A, 11B:
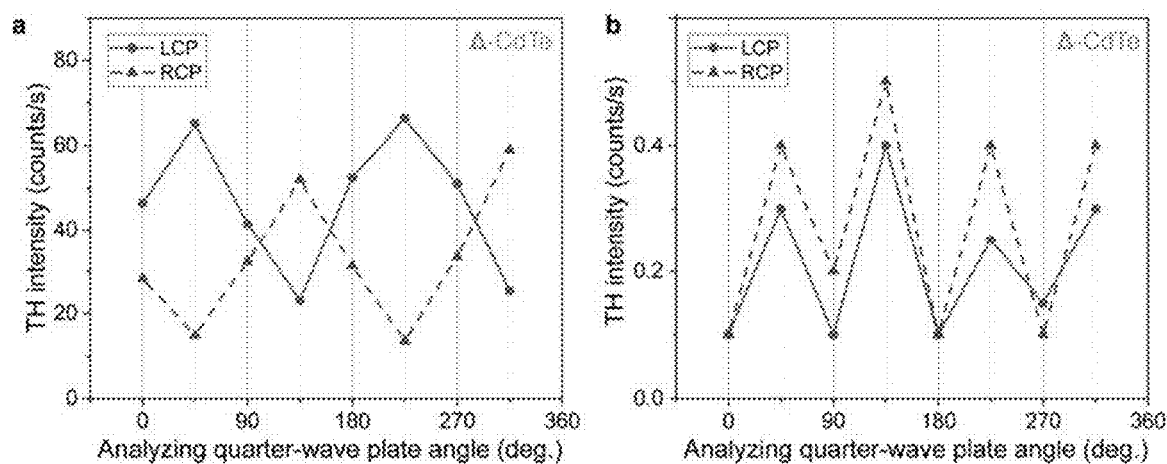

FIGS. 11A-11B show THMS polarization. In FIG. 11A, the TH intensity in the forward direction is shown as a function of an analyzing quarter-wave plate (AWP) rotation angle for Δ-CdTe. LCP and RCP incident light produces LCP and RCP TH light, respectively. In FIG. 11B, the TH intensity in the 90° direction is shown, as a function of an AWP rotation angle for Δ-CdTe.

Figure 12:
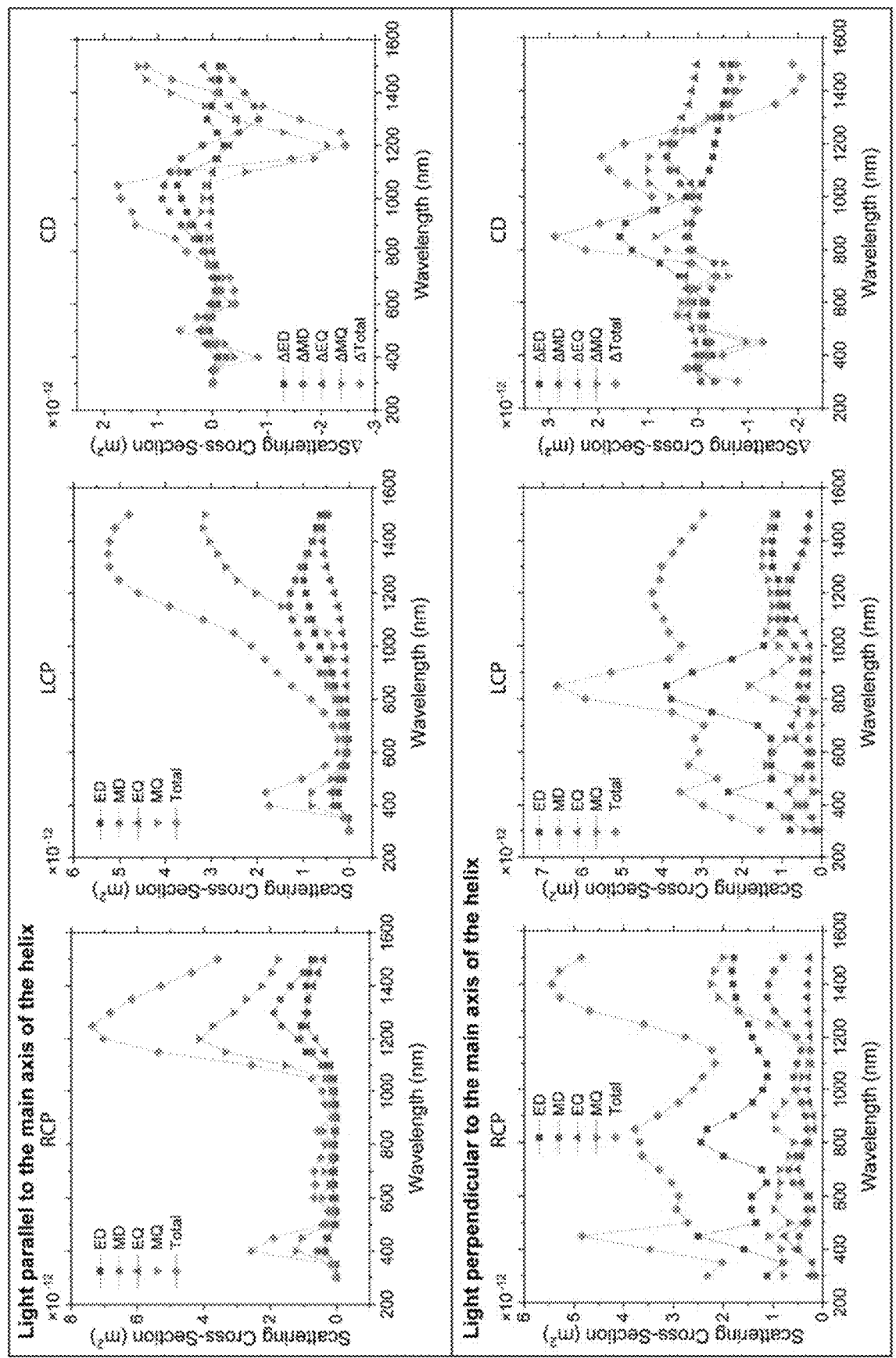

FIG. 12 shows multipolar spectral decomposition of the nanohelix scattering cross section. The curves correspond to the electric dipole (ED), magnetic dipole (MD), electric quadrupole (EQ) and magnetic quadrupole (QD), as well as the total scattering cross section, upon illumination with right- and left-circularly polarized light (LCP and RCP, respectively). The circular difference (CD) corresponds to the difference (Δ) in scattering cross section.

Figures 13A, 13B:
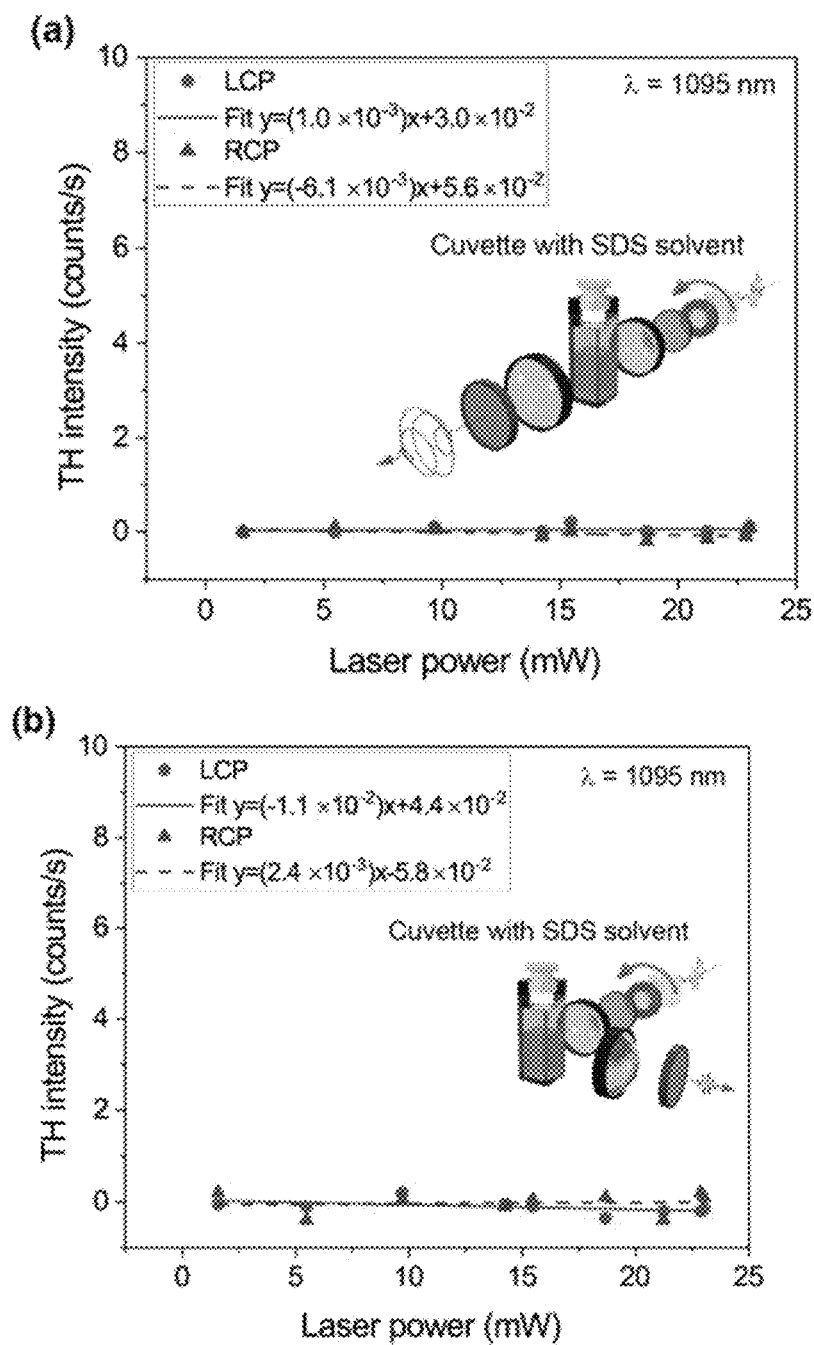

FIGS. 13A-13B assess third harmonic (TH) scattering in liquid media with 0.2% sodium dodecyl sulfate (SDS). FIG. 13A shows TH intensity as a function of incident laser power, for 0.2% SDS illuminated with left circularly polarized (LCP) and right circularly polarized (RCP) light. The inset in FIG. 13A shows a schematic of the setup for measuring TH forward emission. FIG. 13B shows TH intensity as a function of incident laser power, for 0.2% SDS illuminated with LCP and RCP light. An inset in FIG. 13B shows a schematic of the setup for measuring TH emission at a right angle. In both plots, the samples were illuminated with 1095-nm light. The lines are fits to y=Ax+B.

Figures 14A, 14B:
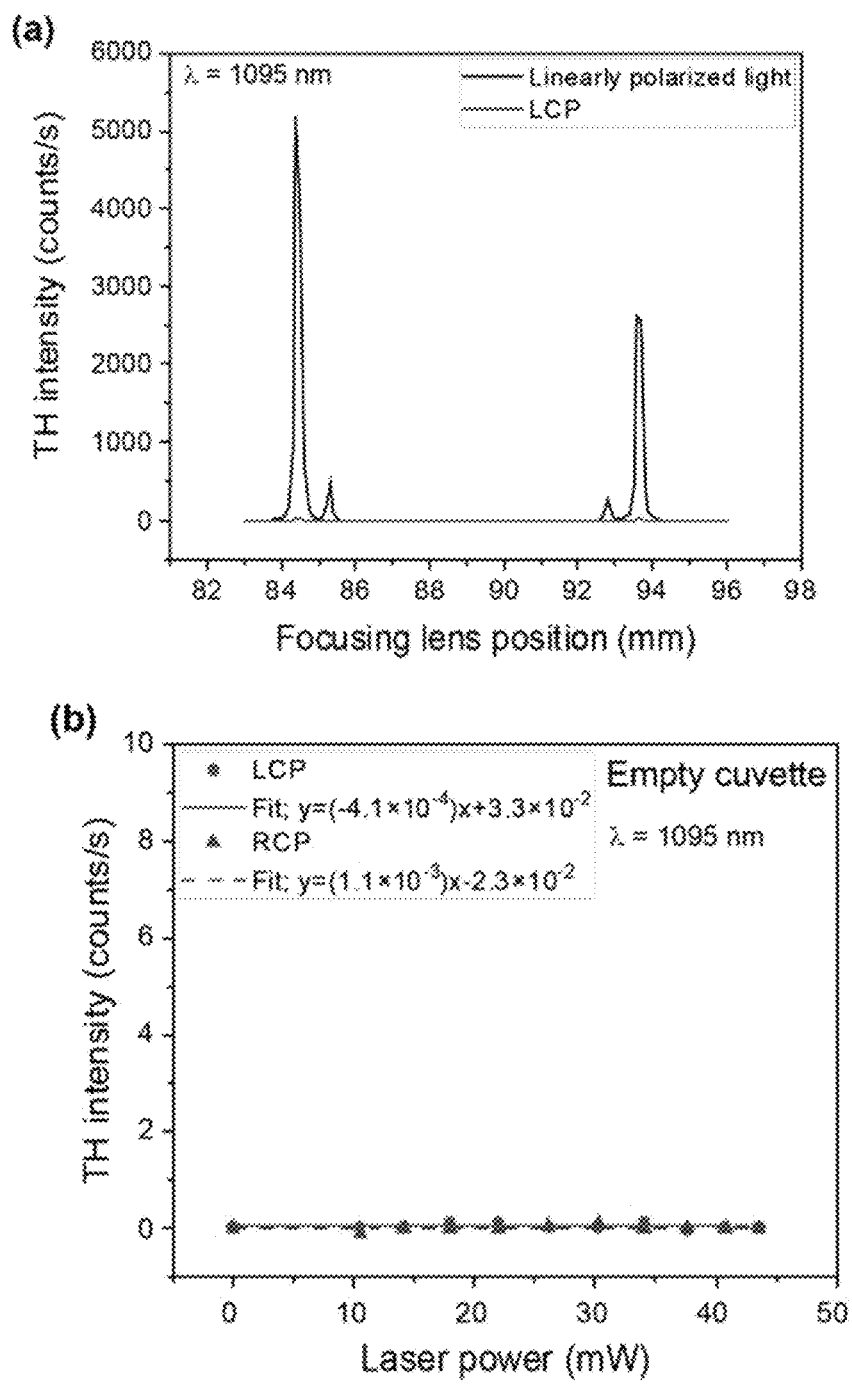

FIGS. 14A-14B assess whether third harmonic (TH) light comes from the 10 mm cuvette interfaces. In FIG. 14A, TH intensity as a function of the position of the focusing lens for illumination with linearly and left circularly polarized (LCP) 1095-nm light (incident power=15 mW). The position of the cuvette, which contained Λ-CdTe, was fixed. Measurements were done in the forward scattering geometry. In FIG. 14B, TH intensity as a function of incident power measured for an empty cuvette in the forward scattering geometry. The focusing lens was positioned at 89.5 mm. The lines are fits to y=Ax+B.

Figure 15A:
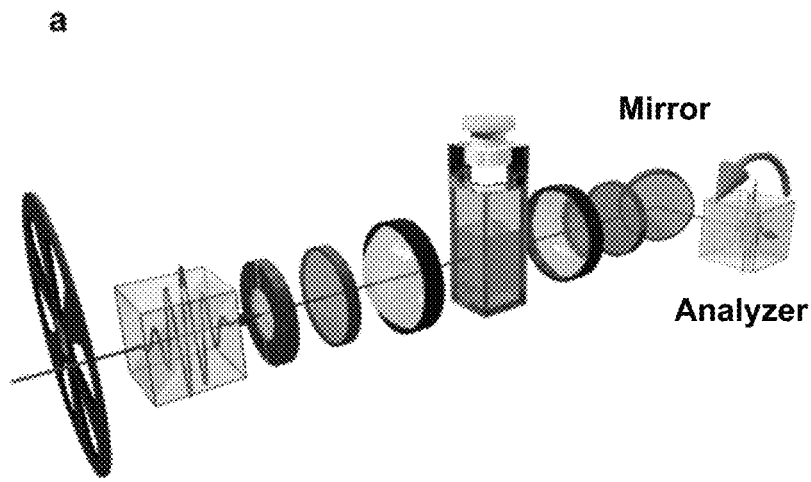
Figure 15B:
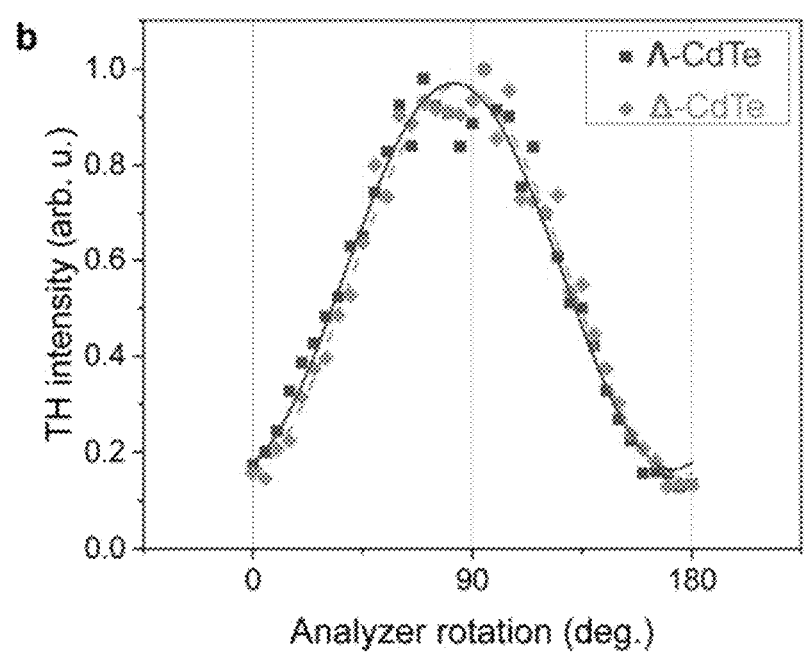

FIGS. 15A-15B show no third harmonic (TH) optical rotation was observed. In FIG. 15A, a schematic diagram of the setup is depicted. In FIG. 15B, TH intensity as a function of analyzer angle for both chiral forms of nanoparticles (differentiate Λ-CdTe and Δ-CdTe) prepared in accordance with the present disclosure are shown.

Figure 16:
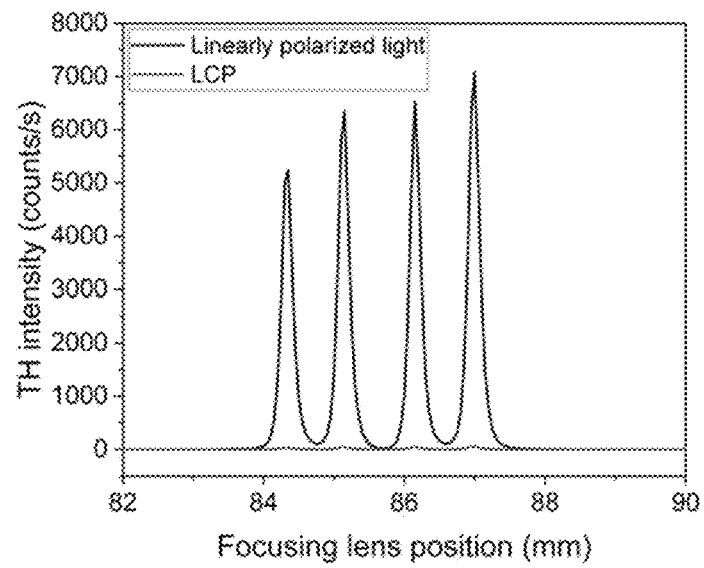
Figure 17A:
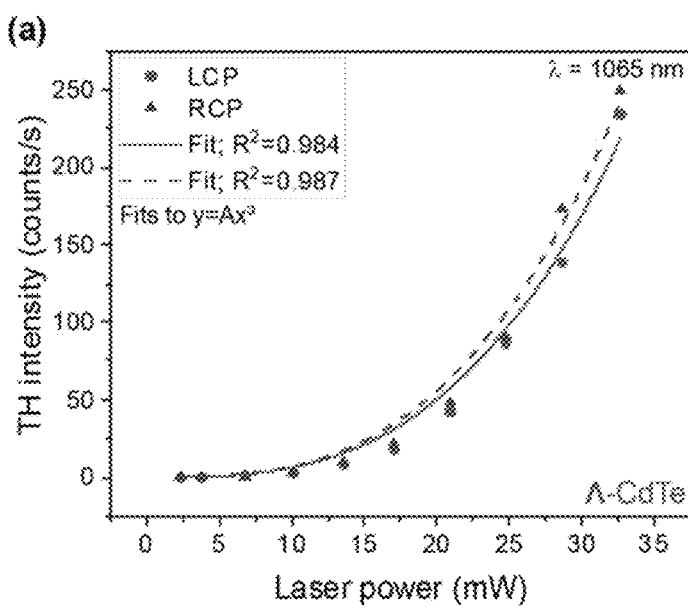
Figures 17B, 17C, 17D:
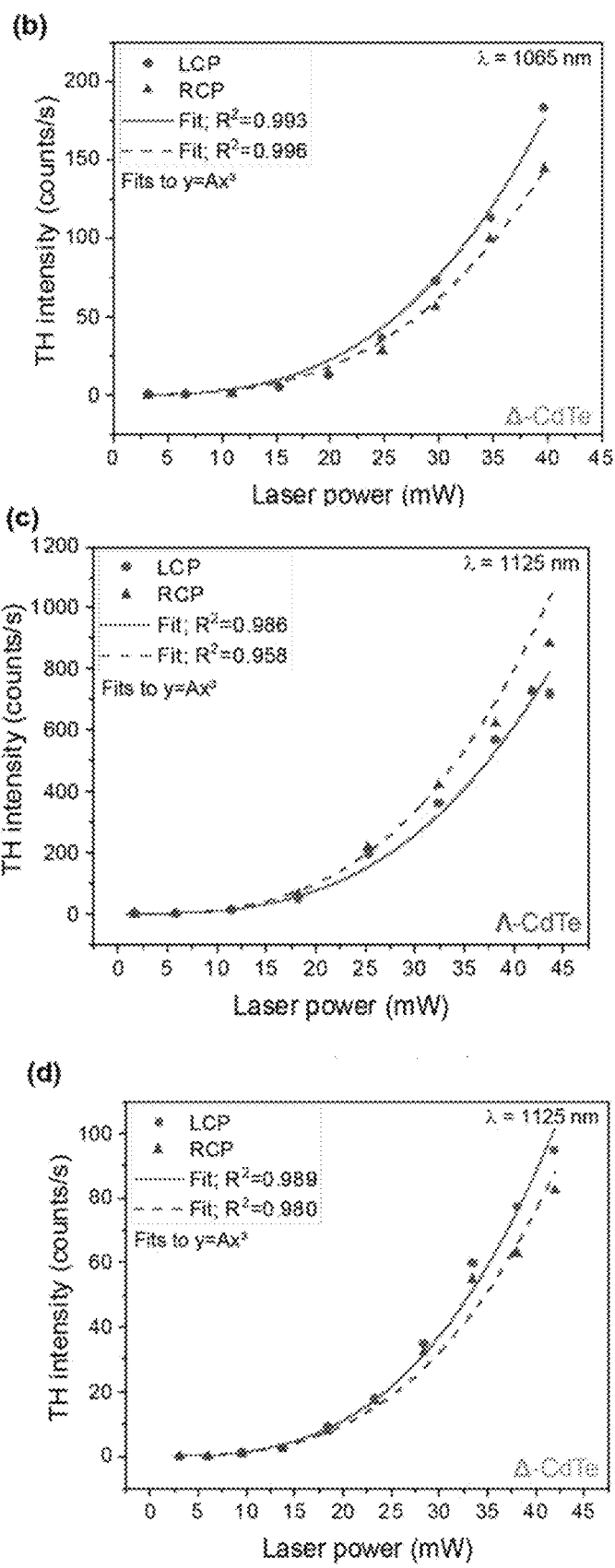

FIG. 16 shows no third harmonic (TH) light from the 1 mm cuvette interfaces. More specifically, FIG. 16 shows TH intensity as a function of the position of the focusing lens for illumination with linearly and left circularly polarized (LCP) 1095-nm light (incident power=15 mW). Measurements were done in the forward scattering geometry.

FIGS. 17A-17D show optical activity in third harmonic (TH) Mie forward scattering at two wavelengths when samples are measured in a cuvette with 1-mm path-length. TH intensity measured at 1065 nm as a function of incident power for FIG. 17A for Λ-CdTe nanohelices and FIG. 17B for Δ-CdTe nanohelices in the forward scattering configuration. Similar measurements at 1125 nm are presented in FIG. 17C for Λ-CdTe and FIG. 17D for Δ-CdTe. In all measurements, the incident light is left circularly polarized (LCP) or right circularly polarized (RCP). Each data point is a median of 50 measurements. The data sets are fitted with a function of the form $y=Ax^3$.

Corresponding reference numerals indicate corresponding parts throughout the several views of the drawings.

DETAILED DESCRIPTION

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

In various aspects, the present disclosure contemplates use of a new chirooptical effect in certain chiral nanoparticle structures that can be used for characterization of samples, especially for small volume samples, for example, less than or equal to about 1 microliter (µL) in volume. In certain aspects, the sample volume may be as small as $10^5$ µL. Thus, nonlinear chiroptical characterization of inorganic nanostructures in small volumes is contemplated by using circularly polarized Mie scattering spectroscopy. Light is a transverse electromagnetic wave, but natural light is generally unpolarized with all planes of propagation being equally probable. Generally, circular polarized light (CPL) typically has two perpendicular electromagnetic waves of equal amplitude and 90° difference in phase and may have either a left-handed orientation (where the electric vector of light originating from a source appears to rotate clockwise) or a right-handed orientation (where the electric vector of light originating from a source appears to rotate counterclockwise). Elliptical polarized light is light that has two perpendicular waves of unequal amplitude that differ in phase by 90° and may be used similar to circular polarized light.

Chirality of a nanoparticle means that a nanoparticle or nanostructure exhibits asymmetrical optical activity with different handedness (clockwise to form left handed chirality (S, L, or ∧ orientation) and counterclockwise to form right handed chirality (R, D, or Δ orientation). The nanoparticles may be provided in relatively pure enantiomeric mixtures, for example, having greater than or equal to about 99% enantiomeric purity or optionally greater than or equal to about 99.5% enantiomeric purity of either left (∧) or right (Δ) handedness of the enantiomer nanoparticle species in the mixture. The nanoparticle component(s) are desirably a dispersion of the chiral nanoparticle(s) in a liquid medium, such as an aqueous medium. Such nanoparticle dispersions are desirably stable at ambient conditions.

A "nanoparticle" is a solid or semi-solid material that can have a variety of shapes or morphologies, and may include nanostructures or assemblies of nanoparticles. However, a nanoparticle is generally understood by those of skill in the art to mean that the particle/structure has at least one spatial dimension that is less than or equal to about 10 micrometers (μm) (10,000 nm). In certain aspects, a nanoparticle has at least one spatial dimension, such as thickness or diameter, that is greater than or equal to about 2 nm and less than or equal to about 5 μm, optionally greater than or equal to about 2 nm and less than or equal to about 3 μm, optionally greater than or equal to about 2 nm and less than or equal to about 1 μm, optionally greater than or equal to about 2 nm and less than or equal to about 500 nm, optionally greater than or equal to about 2 nm and less than or equal to about 100 nm, optionally greater than or equal to about 2 nm and less than or equal to about 50 nm, optionally greater than or equal to about 5 nm and less than or equal to about 30 nm and in certain variations, optionally about 25 nm. It should be noted that other dimensions might be greater than these ranges. In certain embodiments, the nanoparticles used in accordance with the present disclosure are nanohelices, nanoribbons, nanorods, or nanoassemblies of any of these nanoparticles. In certain aspects, the chiral nanoparticles are nanoassemblies of nanohelices or nanoribbons, such as assemblies of nanostructured helices.

The chiral nanoparticle may thus comprise or be formed from a light-absorbing material. The chiral nanoparticle may comprise a semiconductor material, including direct and indirect band gap semiconductors. In certain aspects, the chiral nanoparticle formed in accordance with certain aspects of the present disclosure is selected from the group consisting of: CdTe, CdSe, CdS, gold, silver, copper, nickel, iron, carbon, platinum, silicon, HgTe, HgSe, HgS, PbTe, PbSe, PbS, $MoS_2$, $FeS_2$, FeS, FeSe, and combinations thereof. In further aspects, the chiral nanoparticle comprises a semiconductor material like cadmium tellurium (CdTe).

In various aspects, methods are provided in accordance with the present disclosure for experimentally examining chiral optical properties in ultrasmall volumes using third harmonic Mie scattering (THMS) from chiral nanoscale particles. THMS optical activity occurs when three circularly polarized photons at the fundamental frequency produce a single photon at the triple frequency. More specifically, in certain aspects, the methods may use third harmonic Mie scattering (THMS) optical activity observed for suspensions of CdTe nanostructured helices, in volumes several orders of magnitude smaller than 1 μL. As described herein, chiroptical third harmonic emission has been recorded when CdTe helices are illuminated with laser beams having wavelengths of 1065 nm, 1095 nm, and 1125 nm and the THMS intensity was approximately 10 times higher in the forward direction (traveling in a direction originating from the laser light source) than sideways. The third harmonic ellipticity was as high as approximately 3° and this is attributed to the effect of the interference of chiral and achiral effective nonlinear susceptibility tensor components. THMS on semiconductor helices in accordance with certain aspects of the present disclosure provides rapid high-throughput chiroptical characterization of sample volumes, for example, ranging from a volume of less than or equal to about 1 microliter to as small as $10^{-5}$ μL.

As further background, there is a need for the development of new optical tools for performing rapid characterization of chiral nanocompounds in ultrasmall volumes. Nonlinear chiroptical spectroscopies can potentially be observed in focal volumes down to tens of cubic micrometers ($\mu m^3$) and are therefore well suited for microplates with even the highest number of wells. Although nonlinear chiroptical effects applicable in isotropic liquids have been reported, they are technologically too complex for the needs of combinatorial nanochemistry and high throughput synthesis. For instance, in the case of hyper Rayleigh scattering optical activity, the geometry of the well plates is not convenient for registration of nonlinear Rayleigh scattering, for which a 4π integration sphere with the individual sample in the center would be typically required to reduce artifacts and cross-talk between adjacent samples.

Nonlinear chiroptical characterization of inorganic nanostructures in small volumes may be possible by circularly polarized Mie scattering spectroscopy. This scattering modality is advantageous over Rayleigh scattering, because Mie scattering occurs within a small solid angle. The smaller scattering solid angle simplifies the registration and polarization analysis of the scattered photons and it is compatible with the requirements of a microplate geometry. Mie scattering from chiral metallic particles and their assemblies can lead to exceptionally strong dependence on light polarization, torque transfer, and spin-polarized electron ejection. Despite the broad interest that chiral non-metallic particles hold in the context of ultrafast and miniaturized devices, their Mie scattering properties are even less known. Light matter interactions with non-metallic particles may include electric and magnetic dipoles and multipoles, and anapole resonances. Compared to plasmonic counterparts, the electric and magnetic contributions in these non-metallic nanoparticles may become comparable, which leads to enhanced chiroptical properties. The nonlinear chiroptical properties of such individual particles are currently unknown.

In the context of the present disclosure, the nonlinear scattering processes of CdTe semiconductor helices are explored and a new chiroptical effect is discovered and demonstrated that can be used for characterizing samples of interest, especially very small sample sizes (e.g., less than or equal to about 1 microliter (μL) in volume). In certain aspects, the nanoparticles are CdTe nanoparticles that form self-assembled nanostructured helices. A length of the nanostructured helices may be about 5 to about 8 micrometers (μm), leading to Mie scattering. For brevity, these nanoparticles will be referred to as nanohelices, not only because they display some nanoscale dimensions (for example, having a thickness of approximately 25 nm), but also because they retain to large degree nanoscale dimensions of individual self-assembled nanowires braided together. The semiconductor nanohelices may be obtained at 99.5% enantiomeric purity with both left (∧) and right (Δ) handedness. They are randomly dispersed within an isotropic liquid environment in all the samples described herein. Their dispersions reveal strong chiroptical third harmonic Mie scattering (THMS) that was observed for three different wavelengths in the near-infrared range of the electromagnetic spectrum.

The THMS of the nanohelices is characterized by approximately 10 times stronger third harmonic (TH) emission in the forward direction than at 90° angle with respect to the incident light. The nonlinear ellipticity can be as high as 3° and it changes sign for ∧—and Δ—CdTe nanohelices. The chiroptical contrast reverses between forward and 90° angle emission, which reveals the phase relationship between chiral and achiral effective tensor components of the TH susceptibility. Furthermore, the chiroptical effect can be observed both in the forward emitted circularly polarized TH light and in the linearly polarized TH light emitted sideways. Finally, a successful chiroptical characterization of CdTe nanohelices is demonstrated in a minuscule (<1 μL) volume using THMS.

Figures 1A, 1B, 1C, 1D, 1E:
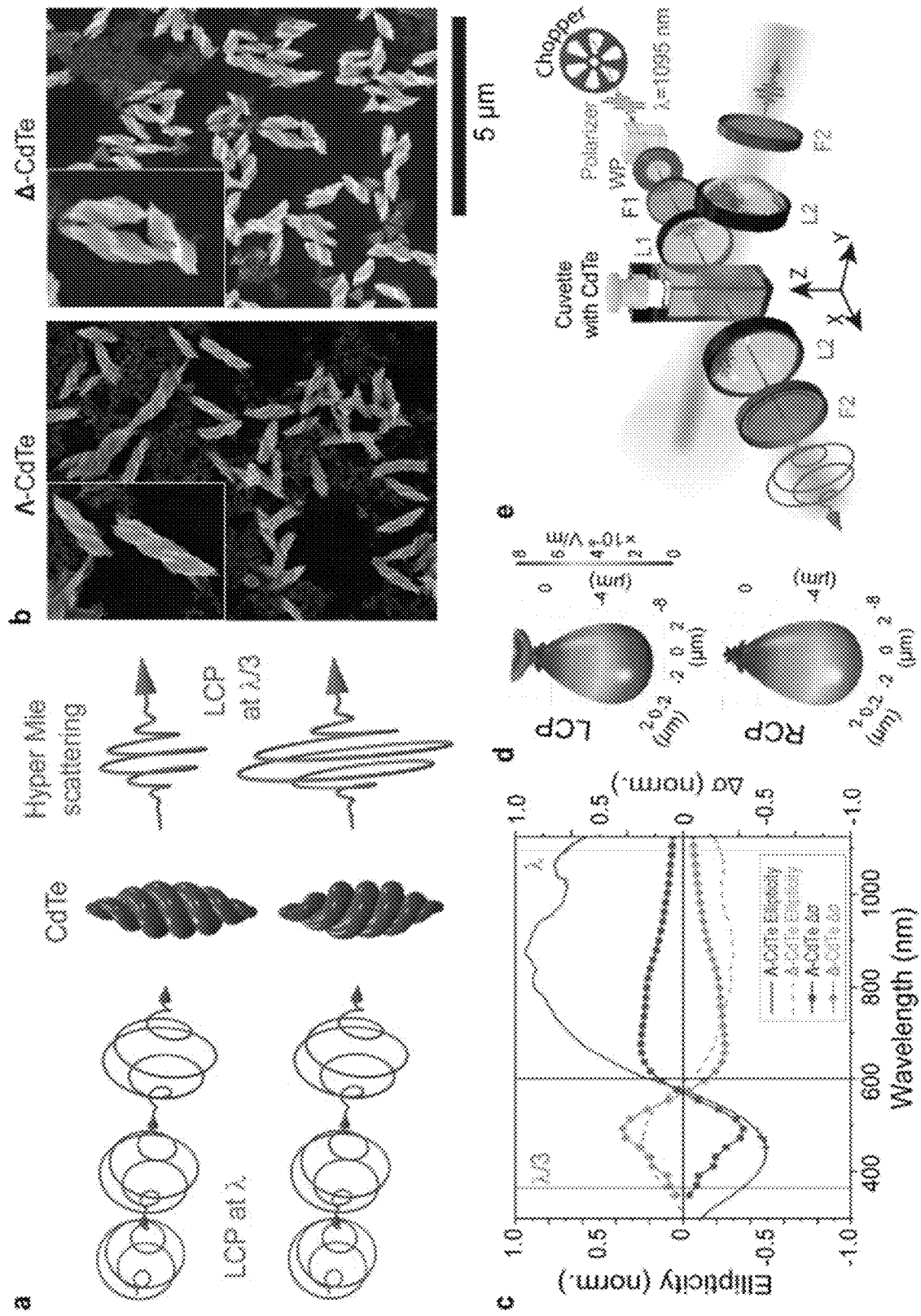

With reference to FIGS. 1A-1E, as noted above, THMS optical activity occurs when three circularly polarized photons at the fundamental frequency produce a single photon at the triple frequency, with a conversion efficiency that depends on the chirality of the CdTe helix and on the handedness of the incident circularly polarized light, as shown in FIG. 1A. This effect is a manifestation of optical activity in the general sense of the term, e.g., where it designates any change of the intensity or polarization of light that is due to material chirality. Prior to the present invention, it is believed that THMS optical activity has never been observed before for any semiconductor, metal, dielectric, or biological samples.

Figure 2C:
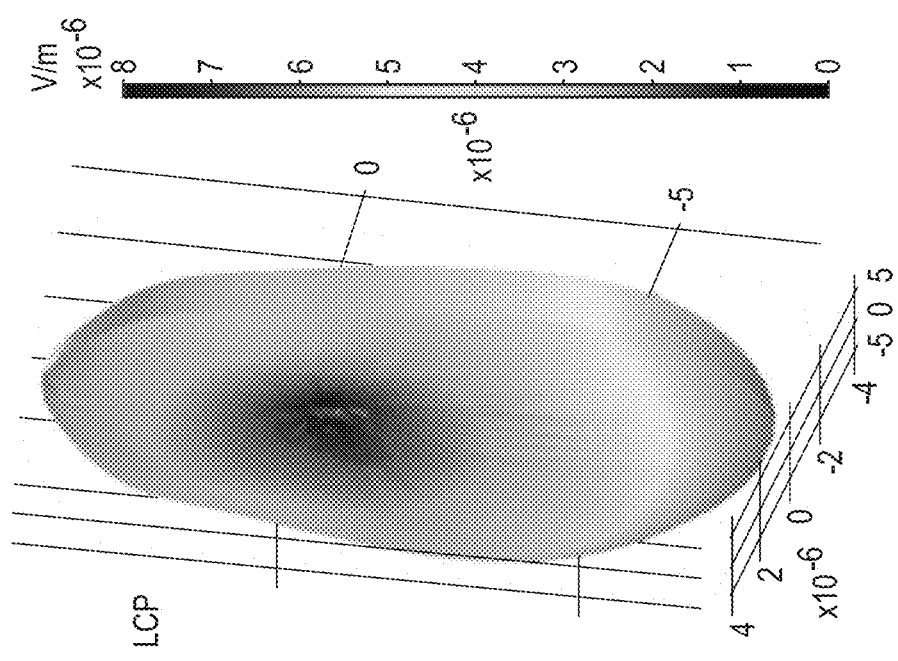
Figure 2C:
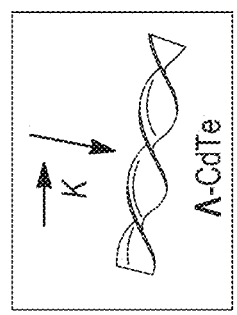
Figure 2C:
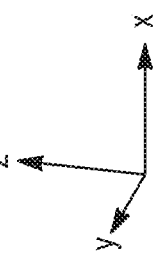
Figure 2C:
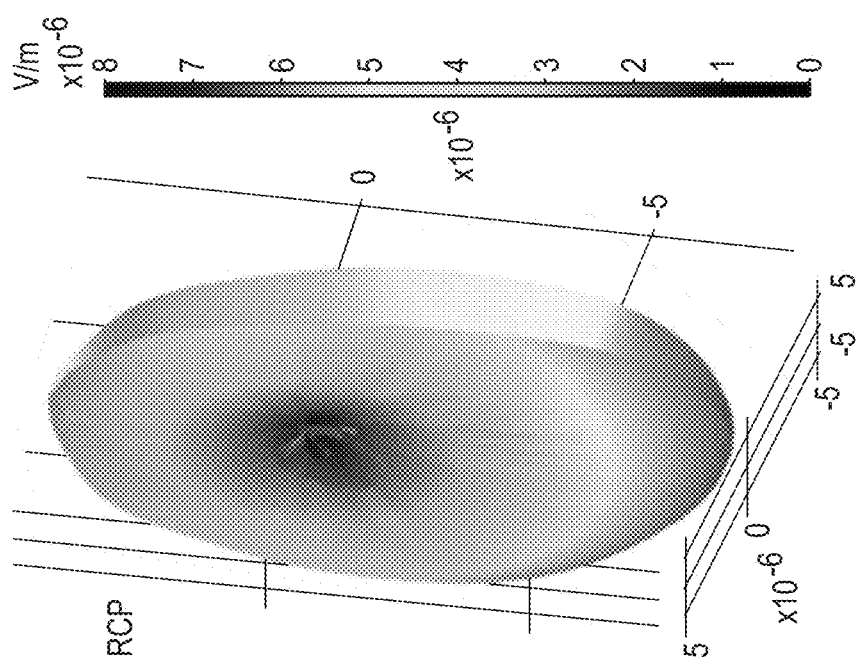

As will be described in the examples below, CdTe nanohelices may be synthesized using a method of J. Yan et al., "Self-Assembly of Chiral Nanoparticles into Semiconductor Helices with Tunable near-Infrared Optical Activity," *Chem. Mater.* 32 (1), pp. 476-488 (2020), the relevant portions of which are incorporated herein by reference, to produce helicoids with a geometry approaching that of twisted ribbons (FIG. 1B). Analyzing the SEM microscopy images and geometrical parameters of the nanohelices (in one batch: thickness 140±20 nm, width 453±70 nm, pitch 302±45 nm) it appears that their uniformity originates from the self-limited assembly of the nanoparticles controlled by electrostatic repulsion. See also, FIG. 2A, showing width, thickness, and pitch of a nanohelix (where thickness is 25 nm and pitch is about 550 nm, from a first apex of a first twist to a second apex of an adjacent twist). Circular dichroism (CD) spectra of the ∧—and Δ—nanohelices have similar bisignate shapes but opposite polarity. The differential extinction cross section spectra of the 3D helix model (FIGS. 2B-2E) calculated by finite difference time domain (FDTD) method match well with the experimental CD spectra (FIG. 1C). The difference in amplitude of experimental CD peaks is attributable to a difference in concentration of the prepared suspensions. FIG. 1D shows the scattering pattern of a Λ-CdTe the nanohelix at the wavelength identical to that of the incident beam, illuminated along the main axis, for LCP and RCP light (more details about these simulations can be found in FIGS. 2A-2E). Clearly, the pattern is characteristic of Mie scattering.

Because the CdTe nanohelices display multiple scales in their organization and include microscale length and submicron scale pitch length comparable with the wavelength of visible and NIR light, they are useful candidates for observation of not only linear chiroptical activity in scattering but also hyper Mie scattering, rather than hyper Rayleigh scattering. The TH experimental setup to evaluate hyper Mie scattering activity is illustrated in FIG. 1E, which includes a laser light source, a chopper, a polarizer, a sample for testing in a cuvette comprising CdTe, along with various lens (designated L) and filters (designated F). The TH scattered light was measured both in the forward direction and at the right angle with respect to the direction of incident light. Briefly, femtosecond laser pulses at wavelength of 1065 nm, 1095 nm and 1125 nm were circularly polarized with an achromatic quarter-wave plate and were focused into a cuvette from fused quartz containing an aqueous dispersion of CdTe nanohelices. The scattered light is then collimated and filtered to select only the TH wavelength, as will be described in the examples.

EXAMPLES

Example A

All chemicals used in this example are analytical grade or the highest purity available. Aluminum telluride ($Al_2Te_3$) used as a source of hydrogen telluride gas was purchased from Materion (product number: 122704). Cadmium perchlorate hexahydrate was purchased from Alfa Aesar (product number: 12936). L- and D-cysteine hydrochloride monohydrate (product number: C7880 and C8005, respectively), thioglycolic acid (product number: 528056), sodium hydroxide (NaOH), hydrochloric acid (HCl), and methanol were purchased from Sigma Aldrich. Deionized water (DI water) was prepared with Milli-Q water purification system (Millipore).

Cadmium telluride nanoparticles (CdTe NPs) were synthesized by following a method from previous publication (N. Gaponik, et al., "Thiol-Capping of CdTe Nanocrystals: An Alternative to Organometallic Synthetic Routes," *J. Phys. Chem.* B, 106 (29), p. 7177-7185 (2002), the relevant portions of which are incorporated herein by reference, after some modifications. For chiral CdTe NPs, an aqueous solution of mixture of cadmium perchlorate hexahydrate (Cd$(ClO_4)_2 \cdot 6H_2O$) and L- or D-cysteine (L-/D-Cys) hydrochloride monohydrate is prepared with final concentration of 18.75 mM and 45 mM in 125 mL of deionized water (DI water). Then the pH of the mixture solution was adjusted to 11.2 by adding 1 M sodium hydroxide (NaOH). The mixture solution was placed in a 250 mL three-neck round-bottomed flask and connected with another 50 mL three-neck round-bottomed flask containing 0.1 g of aluminum telluride powder ($Al_2Te$). These synthesis reaction vessels were purged with nitrogen gas for 30 minutes with vigorous stirring for good mixture of the solution.

Hydrogen telluride gas was generated by injecting 0.5 M hydrogen sulfide into the small flask containing $Al_2Te$ powder and slowly purged into the cadmium precursor and the ligand mixture solution. The solution was then refluxed under nitrogen purging for about 10 hours to obtain the chiral CdTe NPs.

The achiral CdTe NPs were prepared following the same method described above, but by using thioglycolic acid (TGA) as the surface ligand source (18.75 mM) for the cadmium precursor mixture solution. After purging the hydrogen telluride gas slowly, the solution was refluxed for one hour. The as—made NP dispersions were stored in a dark bottle before assembly processes with aging requirements as described below.

Example B

CdTe nanohelices and achiral CdTe nanoribbons colloids are prepared in this example. Self-assembly of nanohelices is as follows. The CdTe NPs carrying L- or D-Cys like those described in Example A were assembled into helical structure with a modified method described in J. Yan et al., *Chem. Mater.* 32, p. 476 (2020) described above and W. Feng, et al., "Assembly of mesoscale helices with near-unity enantiomeric excess and light-matter interactions for chiral semiconductors," *Sci. Adv.* 3 (3), e1601159 (2017), the relevant portions of which are incorporated herein by reference, The dispersions of synthesized chiral CdTe NPs were aged at room temperature in the dark for 3 to 5 days before self-assembly. 20 μL of 0.1 M Cd(ClO$_4$)$_2$·6H$_2$O was injected into the aged 500 μL of chiral NPs and the pH adjusted to 8 with 1 M hydrochloric acid solution. Depending on batch, the solution was then mixed with 1 mL or 1.5 mL of methanol and kept for 3 days in room light conditions. The self-assembled colloid was centrifuged for 3 minutes at 6,000 rpm and the black precipitates were redispersed into DI water. The resulting solution was treated with the same washing process three times to ensure obtaining purified nanohelices colloids. To avoid aggregation of the nanohelices, final precipitates were re-dispersed in 0.05 wt. % of sodium dodecyl sulfate (SDS) solution and sonicated for approximately 1 minute.

Self-assembly of achiral nanoribbons is as follows. The CdTe NPs capped by TGA were assembled into achiral nanoribbons by modifying the method described above for assembly of nanohelicies. Without adding Cd(ClO$_4$)$_2$·6$_2$O, the pH of the aged 500 μL of TGA-CdTe NPs was directly adjusted to 8 with 1 M hydrochloric acid solution, mixed with 1.5 mL of methanol and kept for 3 days in room light conditions. The nanoribbon solution treated with the same washing process of nanohelicies was re-dispersed in 0.05 wt. % of SDS solution and sonicated for approximately 1 minute.

Example C

Characterization of nanoparticle assemblies, like the CdTe nanohelices and achiral CdTe nanoribbons colloids in Example B, are explored in this example.

Linear optical characterization. Suspensions of CdTe nanohelices in fused quartz cuvettes were characterized in an Applied Photophysics Chirascan CD spectrometer. Two photomultiplier tubes (PMTs) were used as detectors—each of them designed for measurements in a different spectral region. Measured CD spectrum of the reference sample (a cuvette with 0.2% SDS) was subtracted from the spectra of the investigated samples. The path length in the cuvette was 10 mm. The time-per-point was set to 0.5 s and the step to 1 nm. Each spectrum was measured three times before taking an average. The bandwidth was set to 2 nm in the 300-600 nm spectral region and to 40 nm in the 600-1130 nm region.

Nonlinear experiments were conducted as follows. A Radiantis Inspire optical parametric oscillator (OPO) pumped by a Ti:sapphire laser was used as the laser source for the nonlinear experiments. The laser pulses were produced by the OPO with a repetition rate of 80 MHz and had a width of 200 fs. An optical chopper with 50% duty cycle modulated the laser beam at a frequency of 246 Hz. An achromatic half-wave plate designed to work in the 690-1200 nm spectral range was placed before an uncoated Glan-Laser calcite polarizer to achieve power control. After passing through the polarizer (transmission axis oriented vertically), an achromatic quarter-wave plate (design wavelength range 690-1200 nm) controlled the polarization state of the laser beam. Left circularly polarized light is defined from the point of view of the source, looking along the direction of propagation, such that the electric field of light traces a helix in space following the positive trigonometric direction. A pair of longpass filters removed light with wavelengths below the filters' cut-on wavelength (1000 nm) from the beam. A coated achromatic doublet lens (design wavelength range 1050-1700 nm, focal length 30 mm) focused the beam into a fused quartz cuvette containing samples.

In experiments measuring scattering at a right angle, an anti-reflection coated 25.4-mm lens was used to collect scattered light. Another anti-reflection coated lens (focal length 200 nm) focused the collected light onto the photocathode of a PMT. In experiments performed in transmission geometry, a 25.4-mm focal-length lens was placed after the cuvette and was followed by a colored glass bandpass filter (transmission in the 335-610 nm region), 3 UV-enhanced Al mirrors, and a 200-mm focal-length lens, which focused light onto the photocathode of a PMT.

To investigate the polarization of the THMS light, a superachromatic quarter-wave plate (design wavelength range 325-1100 nm) and an uncoated Glan-Laser calcite polarizer were added to the experimental setup.

In all experiments, hard-coated bandpass filters with 10-nm full-width at half-maximum of their transmission peak were placed in front of the detector to isolate scattered light within the desired wavelength range. The signal from the PMT was pre-amplified 5 times before entering a photon counter. The photon counter was used in the gated regime—the signal was measured for an equal period of time with the laser beam blocked and unblocked by the optical chopper to obtain an estimate of the noise and ambient counts.

Electromagnetic simulations are conducted as follows. To compute the linear optical activity of the CdTe nanohelicies, the three-dimensional CdTe nanohelix structure is modeled and the Maxwell's equations are solved using two different techniques. The ranges of the geometric parameters (pitch, width and thickness, FIG. 2A of the three-dimensional CdTe nanohelix model structure have been determined based on the electron microscopic images (FIG. 1B). The model structure has been placed in a dielectric medium with a refractive index equal to 1.33 to represent the water for a colloidal sample. The refractive index for CdTe was adopted from the paper by Treharne et al., Phys. Conf. Ser., 286, 012038 (2011), the relevant portions of which are incorporated herein by reference. Benefiting from simple implementation of the finite-difference time domain (FDTD) technique for a full wave solver, the spectra for chiroptical activity of the CdTe nanohelices were calculated using a commercially available software package Lumerical. Two linearly polarized total-field scattered-field (TFSF) sources that were perpendicular to each other were used to generate CPL by setting equal amplitude by differing in phase by 90° (or −90°).

The FDTD simulation region was defined by a larger box monitor with a stretched-coordinate perfectly matched layer and nonuniform mesh type. Convergence tests with different mesh sizes were performed to determine the best balance between computational time restraints and simulation accuracy. Frequency profile and movie monitors were inserted in the total field region to calculate electric field enhancement in 2D. The absorption and scattering cross-sections of the model structure under opposite CPL were obtained by two analysis groups using box power monitors, and the difference in total extinction cross-section (the sum of absorption and scattering cross-sections) was calculated to compare with ellipticity observed in experimental spectra. The nanohelix models were rotated along the Cartesian axis with a step of 45° to consider random orientation of the object as colloid dispersion. To account for the inner object geometrical parameter variation due to sharpen edges of the nanohelix, calculations were performed for nanohelices with various widths (50, 150, and 350 nm) and the obtained spectra were averaged.

The differential extinction cross section of the nanohelix model matches well with experimental observation. See FIG. 1C. The 2D (x-normal) electric field profile for the ∧-CdTe parallelly oriented along the incident direction of right circularly polarized (RCP) and left circularly polarized (LCP) light source vividly showed the different interaction of the model to the wave with opposite polarity. (FIG. 2B). Movies of ∧-CdTe oriented parallel or perpendicular show information of the electric and magnetic field distribution change under opposite CPLs.

Figure 2D:
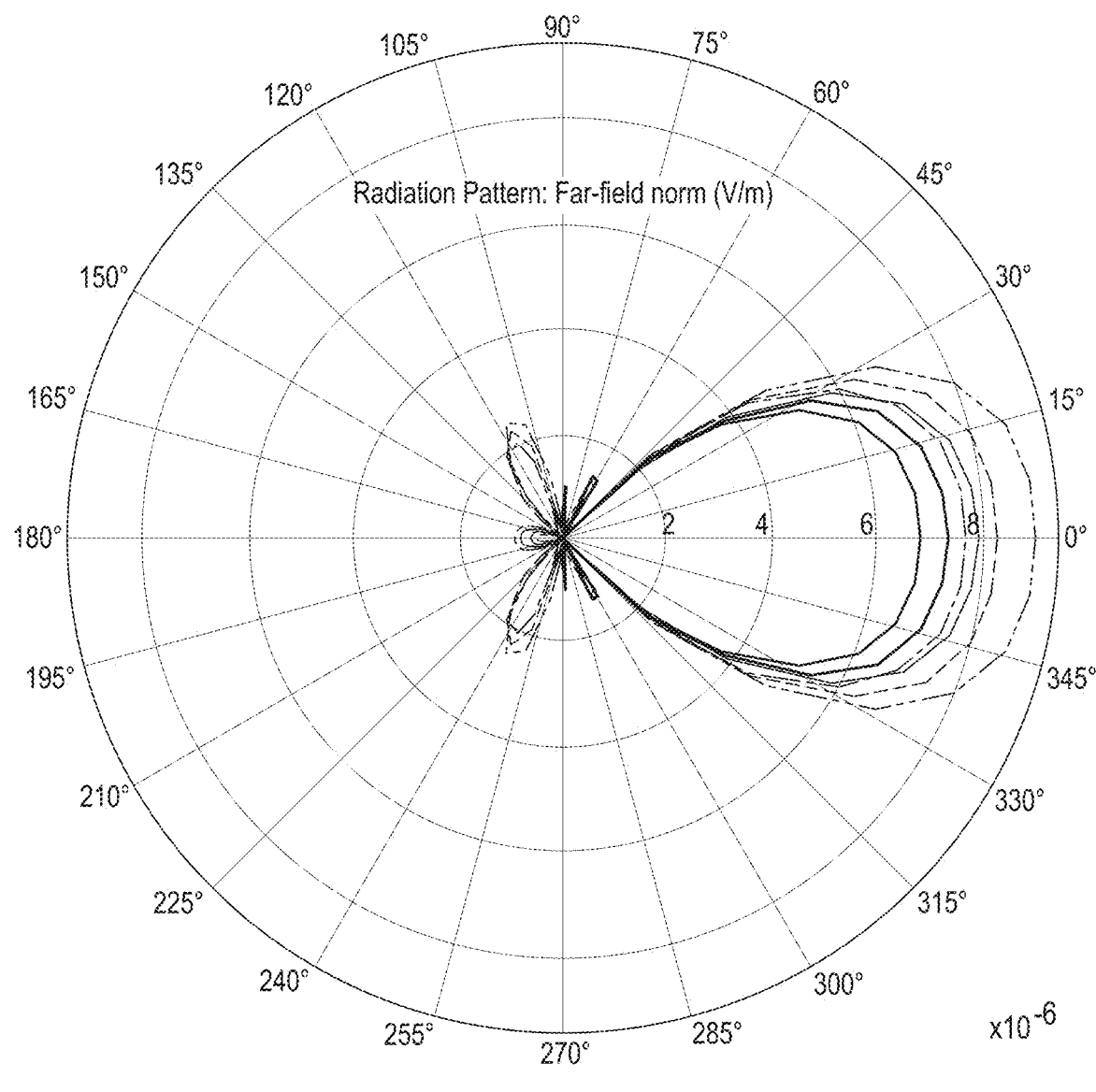
Figure 2E:
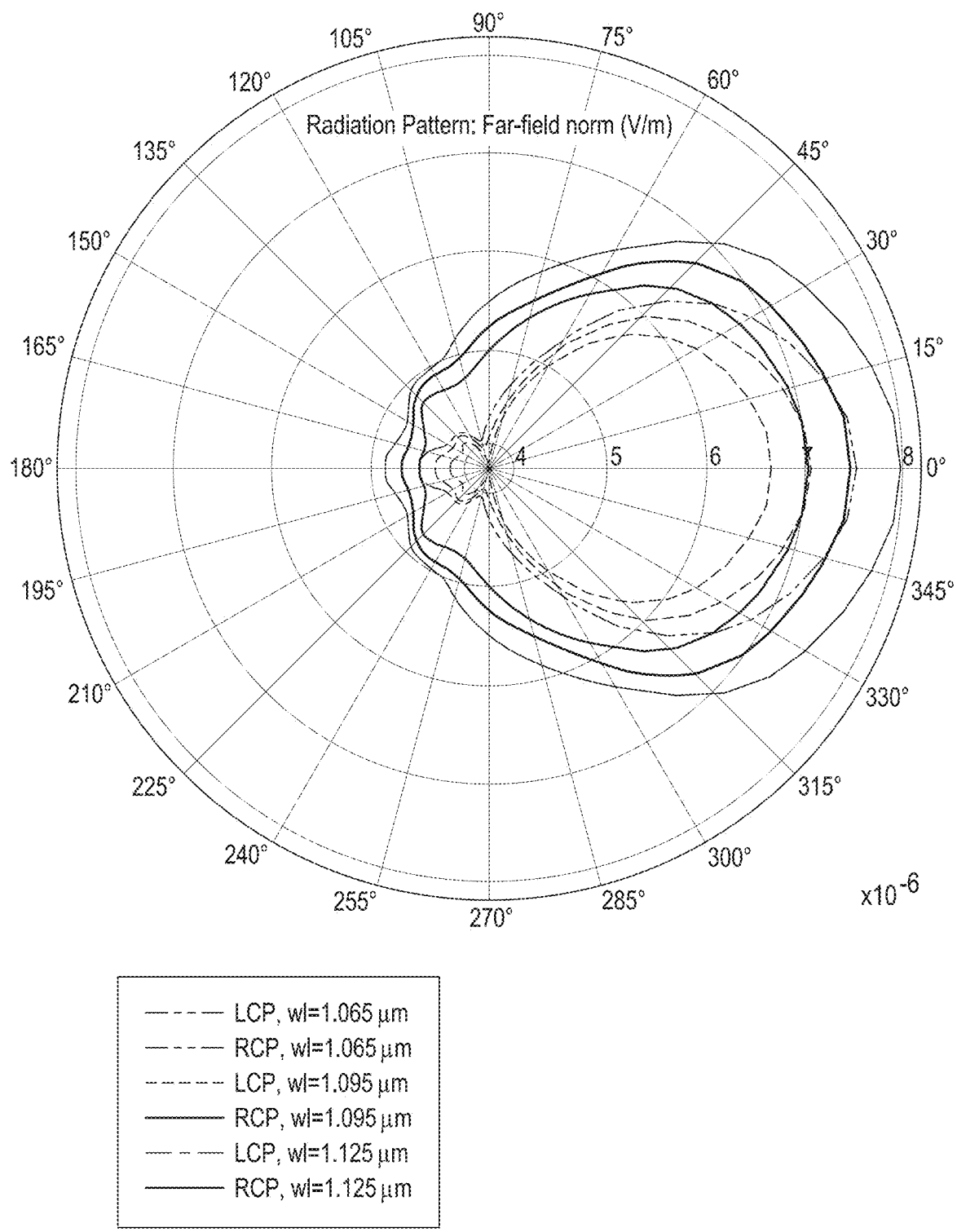
Figures 3A, 3B, 3C, 3D:
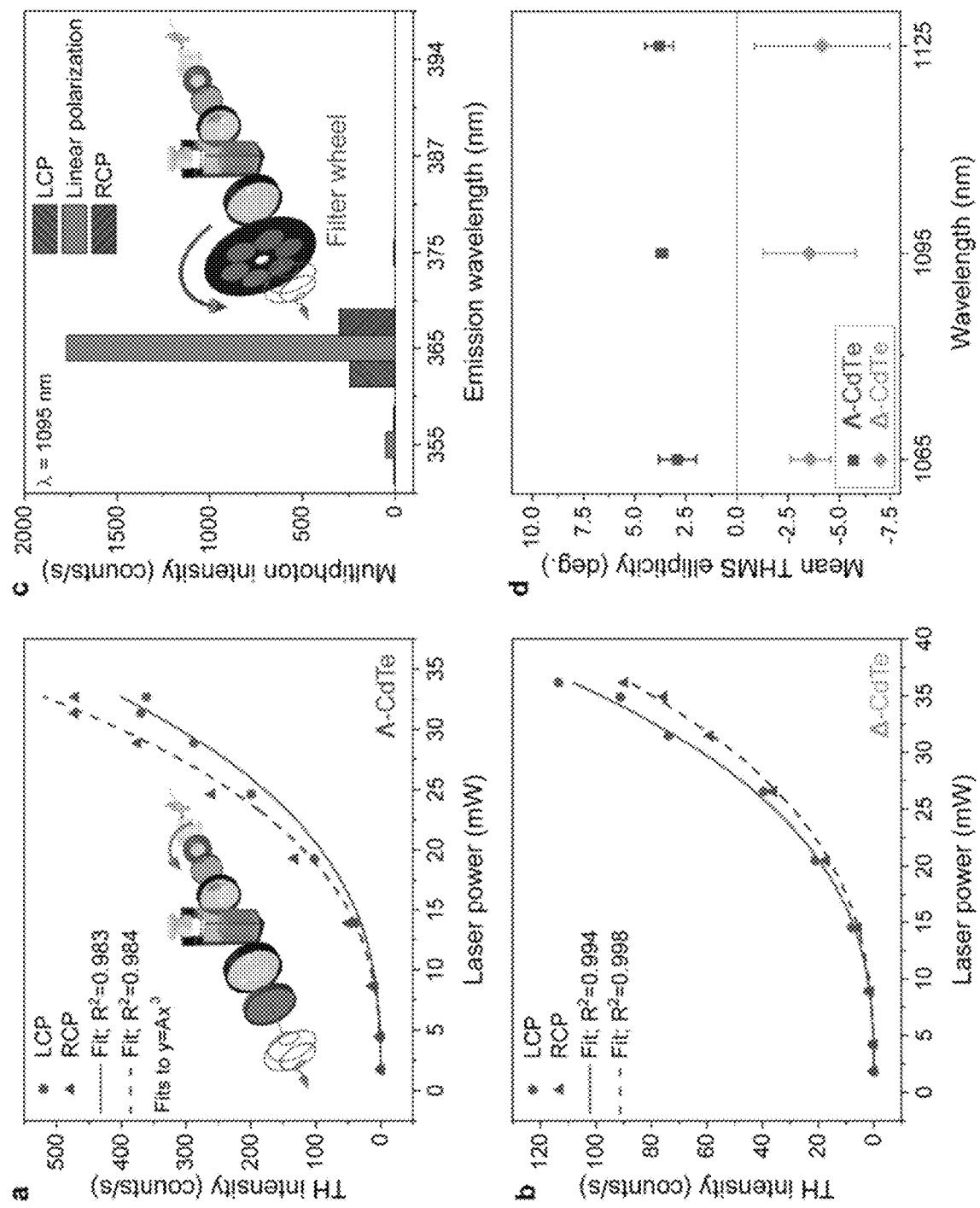

To investigate the optical activity of the nanohelix model at the three different excitation wavelengths (1065 nm, 1095 nm and 1125 nm) in greater depth, the frequency domain form of Maxwell's equations is solved with the finite element method using COMSOL Multiphysics 5.5 software package (the radio frequency module). The radiation patterns for both nanohelix models that were oriented perpendicularly and parallelly to the light propagation direction showed typical Mie scattering behaviors. FIGS. 2C-2E.

Third harmonic (TH) scattering finds increasing applications as a fast and sensitive method for screening the second hyperpolarizability. Because of their strong forward directionality, the results in these examples are clearly indicative of a Mie scattering process, rather than Rayleigh scattering. A computational model confirms that radiation patterns from the CdTe nanohelices with the same geometrical scale show the typical Mie scattering behavior for electromagnetic waves with all three excitation wavelengths. (FIGS. 2C-2F). Accurately accounting for different scattering contributions also leads to matching the calculated and the experimental CD spectra (FIG. 1C). A multipolar decomposition of the linear optical spectra (FIG. 12) shows that for circularly polarized excitation, electric and magnetic dipole and quadrupole resonances can be present at both the fundamental and at the third harmonic wavelengths. The spectral position of these resonances depends on the direction of incident light with respect to each helix and, since the particles are rotating freely, all are accessible. As demonstrated in FIG. 4B, circularly polarized fundamental light produces a circularly polarized third harmonic signal. It is therefore reasonable for the nonlinear conversion process to be considered as an energy coupling channel between the resonances identified in FIG. 12, at both the fundamental and the third harmonic.

Being cautious with assigning the physical nature of the observed optical phenomena to THMS, ruling out other competing mechanisms is explored. One possibility is that the results here are due to TH generation (THG) rather than Mie scattering. Both effects are coherent and both effects would produce strong forward emission. Moreover, THG followed by a linear optical scattering process by the nanohelices would direct a small amount of light at the right angle, which could explain the large difference in intensity between FIG. 3A-3D and FIG. 4A-4B. However, THG is forbidden in an isotropic medium with circularly polarized light. One reason is that upon focusing a Gaussian beam in an isotropic medium, as a result of the Gouy phase shift, THG on one side of the focal point cancels THG on the opposite side, by destructive interference. Another reason is that, in the case of CPL, the axial spin angular momentum of each photon is ±ℏ (depending on the direction of CPL). For THG, because there are three incident photons the angular momentum adds up to ±3 h. However, the single outgoing photon can only have a value between ±h. Therefore, in an isotropic medium, such as the liquid environment used here, conservation of angular momentum imposes that THG for CPL illumination is forbidden in the forward direction.

Additionally, any THG from the solvent or by the glass interfaces can be rules out, as demonstrated in FIGS. 13A-13B and 14A-14B, respectively. Moreover, THG followed by linear optical Mie scattering would have resulted in the same sign of the measured ellipticities (in FIGS. 3D and 4B), which is clearly not the case. Furthermore, THG followed by linear chiroptical effects, such as CD, could have also exhibited optical rotation. As discussed in more detail below, the sample was illuminated with linearly polarized light and tested for any such optical rotation; none was found, see FIGS. 15A-15B. THG can be ruled out and in addition, FIGS. 3C and 4C demonstrate the absence of any competing multiphoton luminescence or super-continuum effects.

Mie scattering takes place at a scale that is between point scatterers (Rayleigh scattering) and geometric optics. At the microscopic scale, the induced electric dipole moment can be written as:

$$\mu_i = \alpha_{ij}E_j + \beta_{ijk}E_jE_k + \gamma_{ijkl}E_jE_kE_l + \quad (2)$$

where i, j, k and l can represent any of the Cartesian directions in the x, y, z coordinate system of the helix, a is the polarizability tensor, β is the first hyperpolarizability tensor, γ is the second hyperpolarizability tensor and $E_j$ is the electric field component at the fundamental frequency of light, along the j Cartesian direction of the helix coordinate system (that can take x, y or z values). The induced dipole moment per unit volume at the TH can then be written as:

$$P_I(3\omega) = \chi_{IJKL}E_J(\omega)E_K(\omega)E_L(\omega), \quad (3)$$

where $\chi_{IJKL}$ is the macroscopic third-order susceptibility and I, J, K and L represent any of the Cartesian directions in the X, Y, Z coordinate system of the laboratory (FIG. 1D).

$$\chi_{IJKL} = \frac{N\gamma_{ijkl}}{\varepsilon_0}\langle a_{iI}a_{jJ}a_{kK}a_{kK}\rangle, \text{ where } a_{iI}, a_{jJ}, a_{kK} \text{ and } a_{kK}$$

are the direction cosines linking the two frames of reference and ⟨...⟩ denotes a statistical average of the orientation of the scatterers, whose number is N. $\varepsilon_0$ is the permittivity of vacuum.

For an isotropic chiral medium, such as an enantiopure suspension of nanohelices, $\chi_{IJKL}$ is not zero. The isotropic chiral symmetry group belongs to one of the seven Curie limiting point groups of anisotropic materials. It is denoted by ∞∞ in Hermann-Mauguin, ∞/∞ in Shubnikov, K in Schoenflies and ∞/∞2 in International notations. It has three independent tensor components $\chi_{IIJJ}$, $\chi_{IJJI}$, $\chi_{IJIJ}$ and they are related by $\chi_{IIJJ} + \chi_{XIIJJ} + \chi_{IJIJ}$, where the indices I,J can take any of the laboratory frame coordinates X, Y or Z and where I≠J.

The intensity at the TH is then:

$$I(3\omega) \propto N\langle|\chi_{THS}|^2\rangle I^3(\omega). \quad (4)$$

Generally, in the forward X detection, the TH scattering intensity is $\langle|\chi_{THS}|^2\rangle = \langle|\chi_{ZJKL}|^2\rangle + \langle|\chi_{YJKL}|^2\rangle$, where, for CPL incident light, J, K and L can be either Y or Z but not X. For an isotropic chiral medium, there are tensor components in both $\langle|\chi_{ZJKL}|^2\rangle$ and $\langle|\chi_{YJKL}|^2\rangle$, therefore TH polarization is allowed along both Z and Y, which leads to the TH intensities observed—in FIG. 4C, the CPL TH light has both Z and Y components.

Figures 4A, 4B, 4C, 4D:
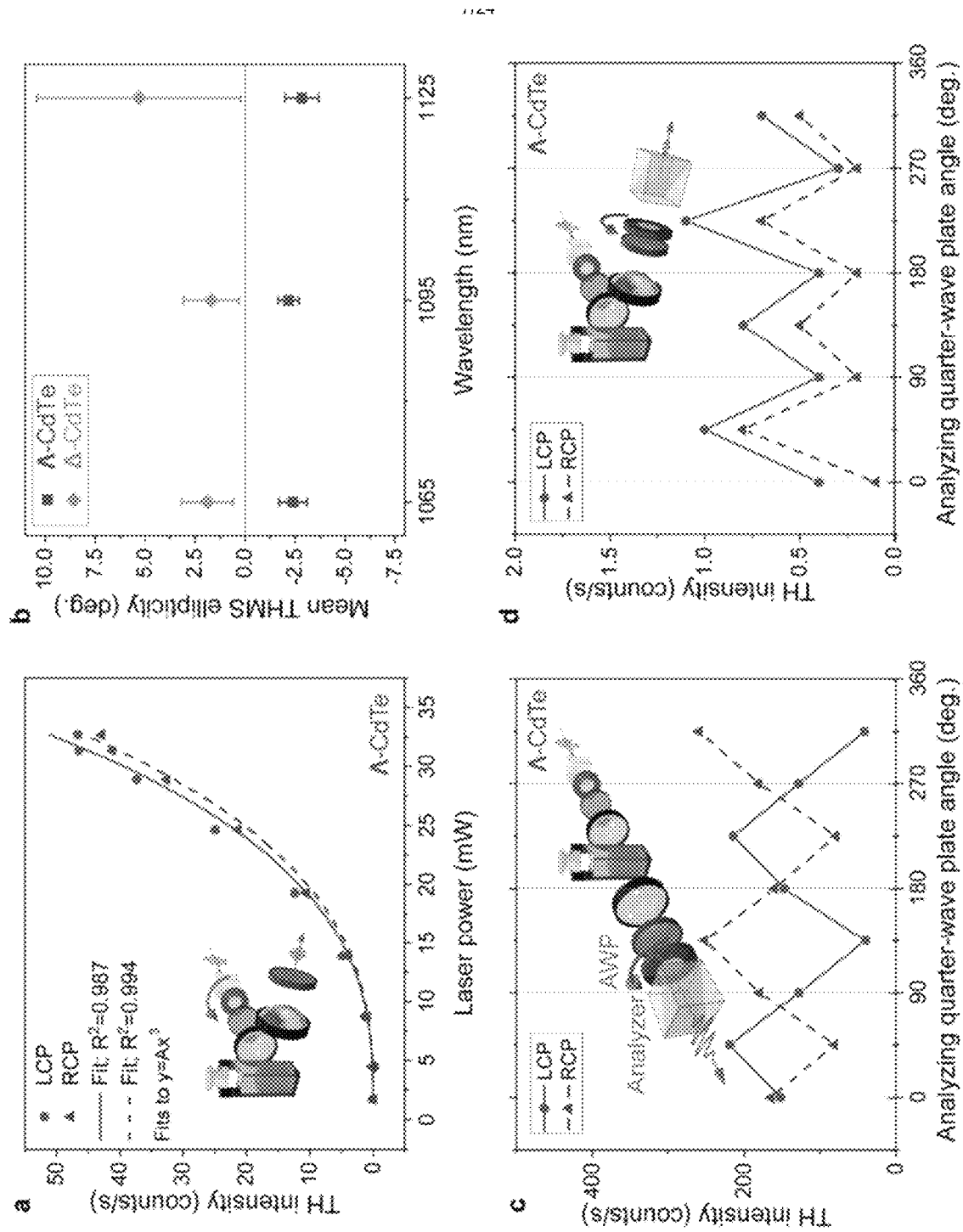

By contrast, in the Y direction (at a right angle with respect to the incident beam), $\langle |\chi_{THS}|^2 \rangle = \langle |\chi_{XJKL}|^2 \rangle + \langle |\chi_{ZJKL}|^2 \rangle$, where again, for CPL illumination, J, K and L can take Y or Z values but not X. As a consequence, in an isotropic chiral medium, only the $\langle |\chi_{ZJKL}|^2 \rangle$ terms can contribute, which means that the TH can only be vertically polarized, as seen in FIG. 4D.

Next, the microscopic hyperpolarizabilities are considered. The symmetry group of the nanohelices is $D_2$ in Schoenflies and 222 in Hermann-Maugin notations. It has 21 independent tensor components, 3 with all indices equal and 18 with equal indices in pairs. To express $\mu_i$ in the lab coordinate system X, Y, Z, the angles $\varphi$ and $\Phi$ are defined, such as Z is along $\varphi=0$ and $\mu_Z=\cos(\varphi)$, $\mu_Y=\sin(\varphi)\cos(\Phi)$, $\mu_X=\sin(\varphi)\sin(\Phi)$. The statistical average for individual $\chi_{IJKL}$ components is then calculated by:

$$\langle \chi_{IJKL} \rangle = \frac{1}{4\pi} \int_0^{2\pi} \int_0^{\pi} \sum_{i,j,k,l} (a_{Ii}a_{Jj}a_{Kk}a_{Ll}) \gamma_{ijkl} \sin(\varphi) d\varphi d\phi. \quad (5)$$

For the $D_2$ symmetry group, we use $$\frac{1}{4\pi} \int_0^{2\pi} \int_0^{\pi} (\cos(\varphi))^4 \sin(\varphi) d\varphi d\phi = \frac{1}{5}$$

to calculate the $\beta_{iii}$ terms and $$\frac{1}{4\pi} \int_0^{2\pi} \int_0^{\pi} (\cos(\varphi))^2 (\sin(\varphi))^2 (\cos(\phi))^2 \sin(\varphi) d\varphi d\phi = \frac{1}{15}$$

to calculate the $\gamma_{iijj}$, $\gamma_{ijij}$ and $\gamma_{ijji}$ terms.
Therefore:

$$\langle \chi_{ZZZZ} \rangle = \frac{1}{5} \sum_i \gamma_{iiii} + \frac{1}{15} \sum_{i,j} (\gamma_{iijj} + \gamma_{ijij} + \gamma_{ijji}). \quad (6)$$

Similar values can be calculated for the other macroscopic susceptibilities. However, because there are 21 microscopic hyperpolarizability tensor elements, each of them being complex, the number of parameters is too large for intuitive understanding.

For simplicity, here, an alternative notation is adopted, with effective chiral and achiral parts of the macroscopic susceptibility. The latter includes any contributions from the solvent or from degraded, achiral CdTe particles. In the following expression, upon reversing the sample chirality the chiral part changes sign but the achiral part does not (changing the direction of CPL has an equivalent effect):

$$|\chi_{IJKL}|^2_{LCP/RCP} = |\chi_{IJKL}^{achir} \pm \chi_{IJKL}^{chir}|| \quad (7)$$

In this case, the TH ellipticity is proportional to:

$$\frac{|\chi_{IJKL}|^2_{RCP} - |\chi_{IJKL}|^2_{LCP}}{|\chi_{IJKL}|^2_{RCP} + |\chi_{IJKL}|^2_{LCP}} = \frac{-|\chi_{IJKL}^{chir}||\chi_{IJKL}^{achir}|}{|\chi_{IJKL}^{achir}|^2 + |\chi_{IJKL}^{chir}|^2} \cos(\sigma), \quad (8)$$

where $\sigma$ is the phase angle between the complex chiral and achiral effective susceptibilities. When $|\chi_{IJKL}^{chir}| \ll |\chi_{IJKL}^{achir}|$, this quantity is directly proportional to the chiral part of the nonlinear susceptibility. When $|\chi_{IJKL}^{chir}| \gg |\chi_{IJKL}^{achir}|$, the measured quantity is inversely proportional to the chiral part of the nonlinear susceptibility. When $|\chi_{IJKL}^{chir}|$ approximately $|\chi_{IJKL}^{achir}|$, the quantity is constant and proportional to $\cos(\sigma)$. When $\sigma=\pi/2$, the chiral and achiral susceptibility parts are out of phase and no chiroptical effect can be measured. The implication also is that chiroptical effects can only be measured when the chiral and achiral tensor components interfere. Because the sign of the TH ellipticity depends on the phase angle between numerator and denominator, it can be concluded that for the emissions along X(FIG. 3D) and Y(FIG. 4B) σ is opposite.

Figure 6A:
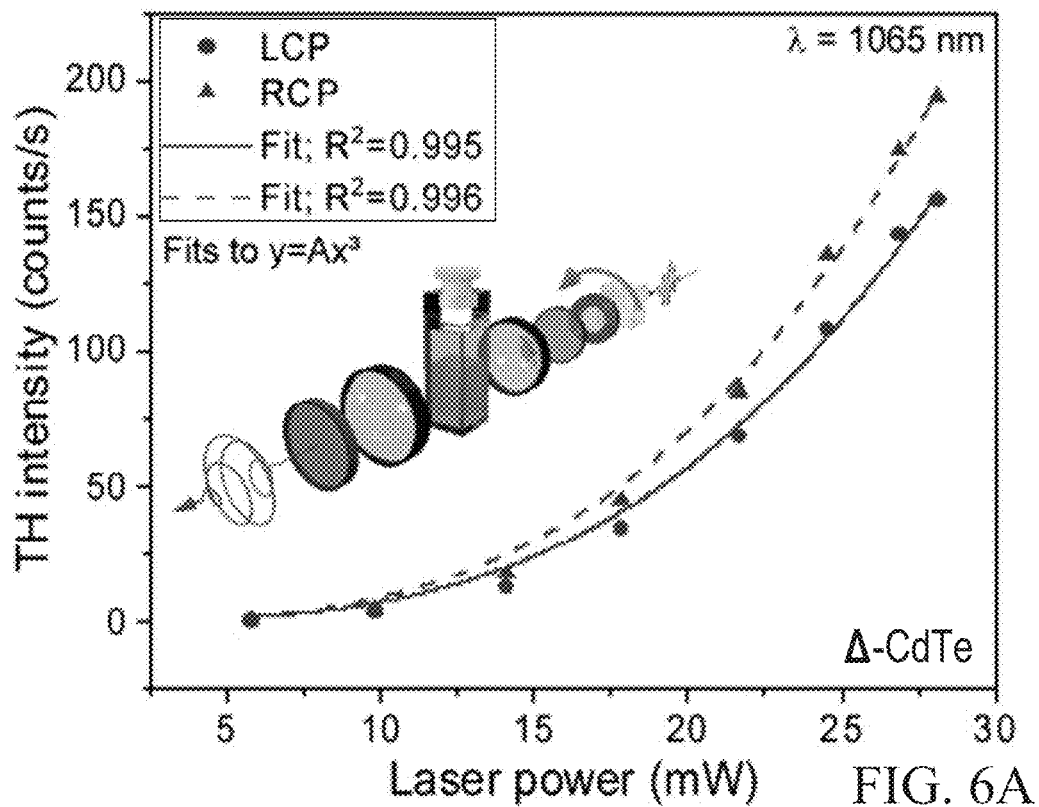
FIG. 6A-6D show optical activity in third harmonic (TH) Mie forward scattering at two wavelengths –1065 nm and 1125 nm. TH intensity measured at 1065 nm as a function of incident power for FIG. 6A for Λ-CdTe (with a schematic of the experimental setup in the inset) and FIG. 6B for Δ-CdTe nanohelices in the forward scattering configuration.
Figure 6B:
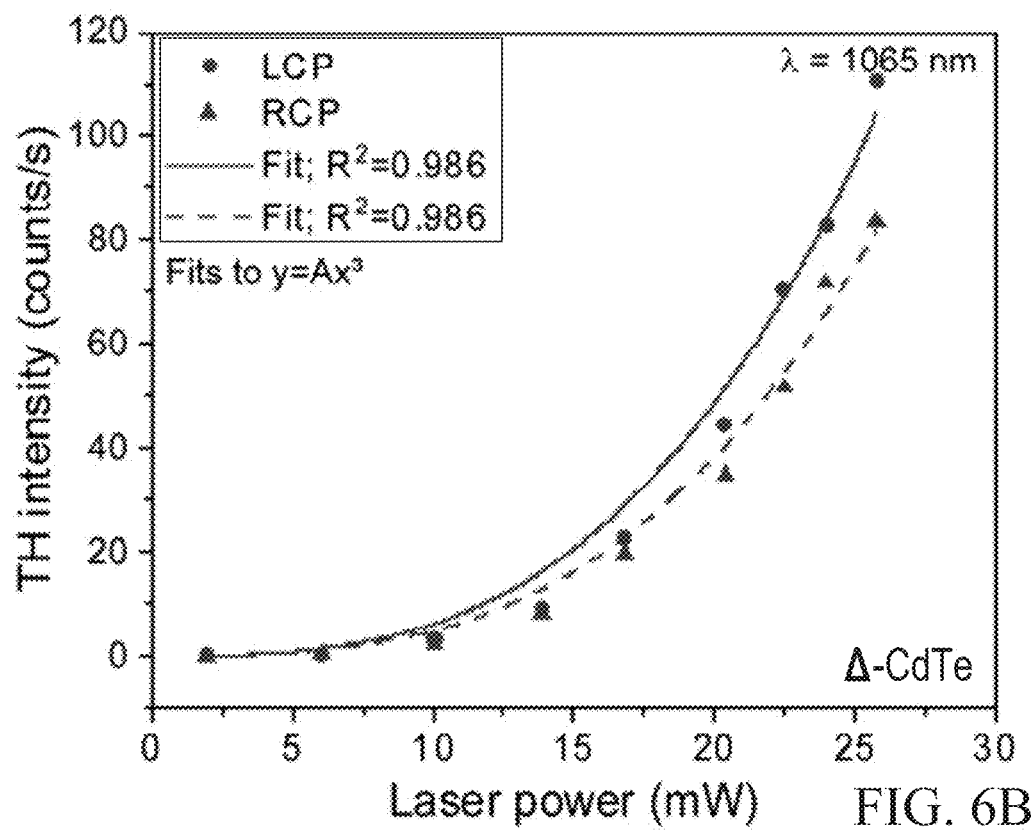
Figure 6C:
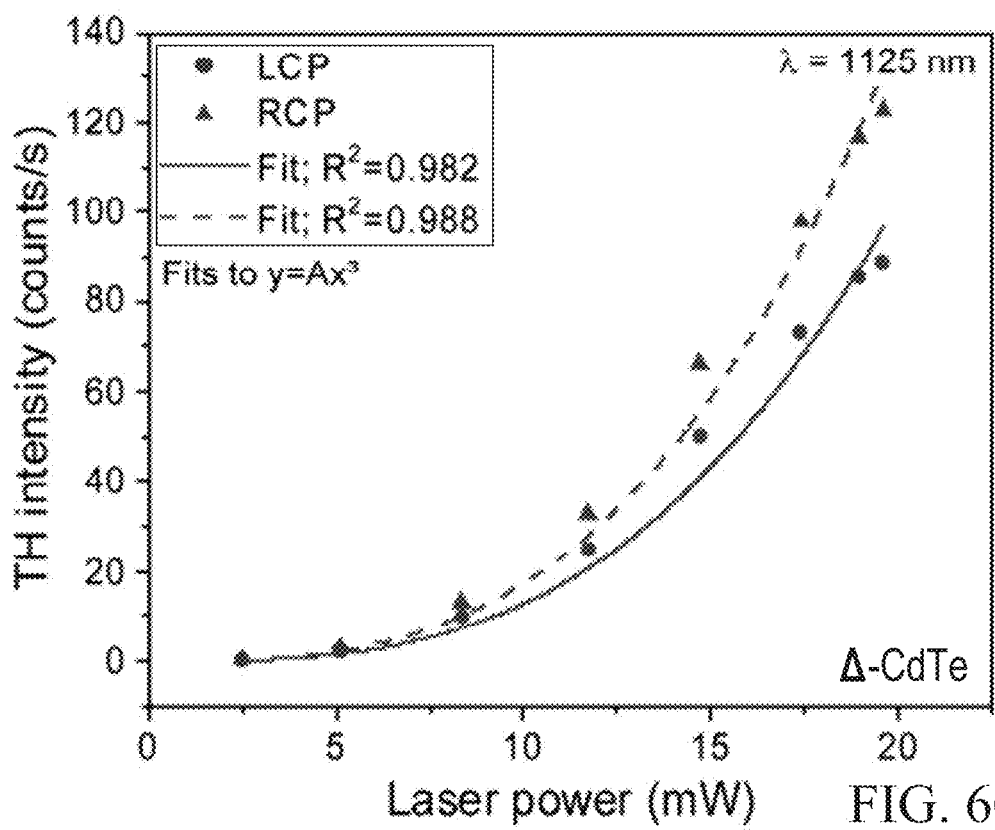
Figure 6D:
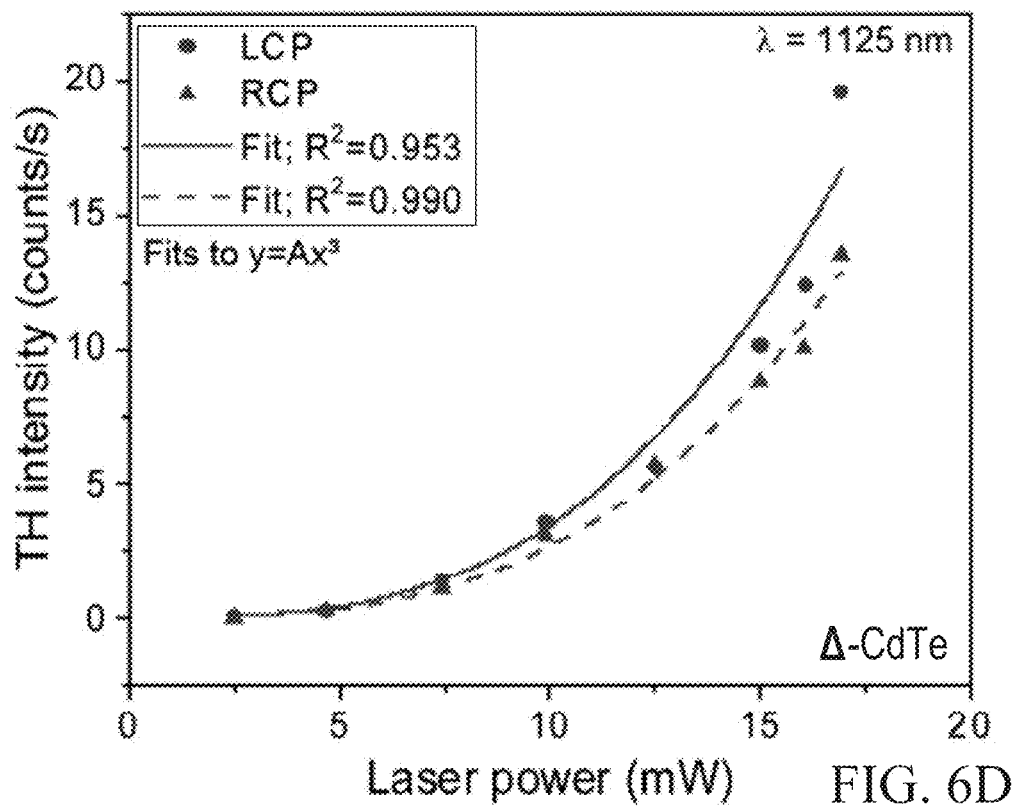

Third harmonic hyper Mie scattering optical activity at 1065 nm and 1125 nm—forward scattering. As described above, power dependence measurements of third harmonic (TH) forward scattering were presented for illumination with 1095-nm light. FIG. 6A-6D show similar measurements at two other wavelengths—1065 nm and 1125 nm—for ∧-CdTe and Δ-CdTe. A schematic of the experimental setup is shown in the inset of FIG. 6A. In all measurements, the incident light is left circularly polarized (LCP) or right circularly polarized (RCP). Each data point is a median of 50 measurements. The data sets are fitted with a function of the form $y=Ax^3$. At both wavelengths, clear optical activity is observed. The sign of the optical activity reverses with the handedness of the CdTe nanohelices.

Figures 7A, 7B:
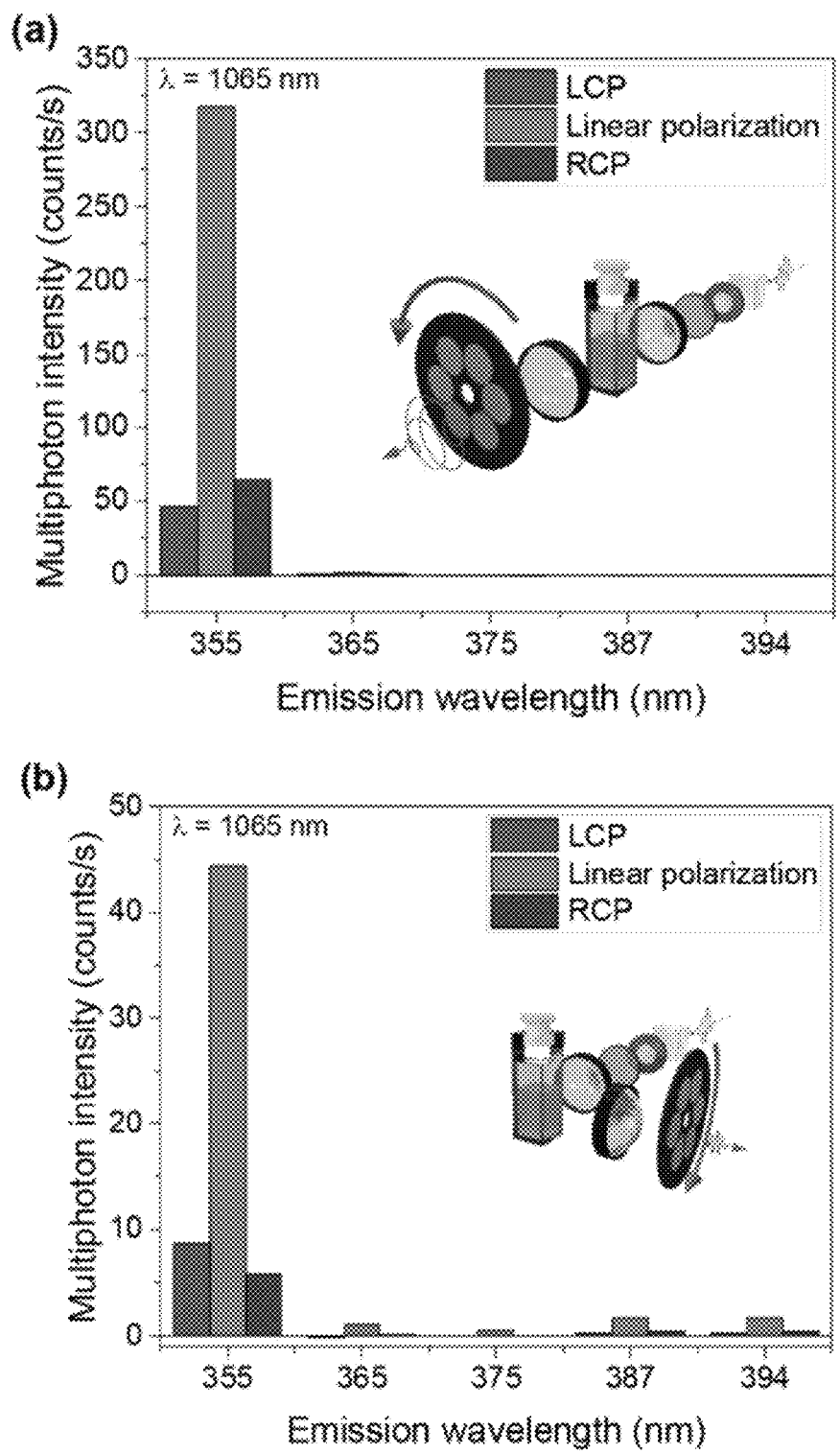
FIGS. 7A-7B show clear emissions at the third harmonic wavelength upon illumination with 1065-nm light. Multiphoton emission by Λ-CdTe nanohelices in FIG. 7A forward and FIG. 7B right-angle scattering configurations, as indicated in the insets.

FIGS. 7A-7B show multiphoton emission for illumination at 1065 nm. More specifically, FIGS. 7A-7B show emission spectra of suspensions of A-CdTe nanohelices when they are illuminated with 1065-nm light. The incident light was left circularly polarized (LCP), linearly polarized or right circularly polarized (RCP). The incident power was 18.5 mW. Both for forward and right-angle scattering, the signal detected at the TH wavelength clearly stands out in the multiphoton luminescence background.

FIGS. 8A-8I show comparative third harmonic hyper Mie scattering for achiral CdTe nanoribbons. Achiral CdTe nanoribbons with geometry as shown in FIGS. 8A-8C were measured in a setup identical to the one used for the CdTe nanohelices. The TH intensity in the forward scattering geometry, detected upon illumination with 1095-nm light, is shown in FIGS. 8D, 8E. The data in the two plots come from two separate measurements performed under the same conditions. Likely due to the large distribution in the size of the nanoribbons, the results are noisier compared to the nanohelices. No optical activity is observed, as evidenced by the fits as well as the calculated TH ellipticities in FIG. 8F. FIGS. 8G, 8H show two separate measurements of TH intensity in right-angle scattering. In the first measurement, the fits indicate larger signal for incident LCP light. In the second measurement, on the other hand, the fits indicate larger signal for incident RCP light. Thus, there is no consistent indication of optical activity. Indeed, when the TH ellipticity is calculated (FIG. 8I), the ellipticities are scattered around zero.

FIGS. 9A-9B show third harmonic hyper Mie scattering optical activity for right-angle scattering confirming THMS optical activity. In FIG. 9A, TH intensity is shown in the right angle direction, as a function of incident laser power, at the wavelength (λ) of 1095 nm, for LCP and RCP light, from right-handed CdTe nanohelices (Δ-CdTe). In FIG. 9B, multiphoton right angle emission from ∧-CdTe nanohelices is shown upon illumination at 1095 nm. The TH signal (at 365 nm) clearly dominates nearby emission wavelengths for incident linearly polarized, LCP and RCP light.

Third harmonic hyper Mie scattering optical activity at 1065 nm and 1125 nm for right-angle scattering experiments at 1065 nm and 1125 nm are shown in FIGS. 10A-10D. TH intensity was measured at 1065 nm as a function of incident power. FIG. 10A shows ∧-CdTe and FIG. 10B shows Δ-CdTe nanohelices in the right-angle scattering configuration. The experimental setup is shown in the inset of FIG. 10A. Similar measurements at 1125 nm are presented in FIG. 10C for ∧-CdTe and FIG. 10D for Δ-CdTe. In all measurements, the incident light is left circularly polarized (LCP) or right circularly polarized (RCP). Each data point is a median of 50 measurements. The data sets are fitted with a function of the form $y=Ax^3$.

The detected TH intensities are significantly lower than in the forward scattering geometry, which is in agreement with the results presented for illumination at 1095 nm discussed above. Again, optical activity is observed and its sign changes with the handedness of the CdTe nanohelices. However, for each sample, the sign of optical activity is opposite to the sign in forward scattering.

Third harmonic Mie scattering polarization is shown in FIGS. 11A-11B. In FIG. 11A, the TH intensity in the forward direction is shown as a function of an analyzing quarter-wave plate (AWP) rotation angle for Δ-CdTe. LCP and RCP incident light produces LCP and RCP TH light, respectively. In FIG. 11B, the TH intensity in the 90° direction is shown, as a function of an AWP rotation angle for Δ-CdTe. LCP and RCP incident light produce linearly polarized TH light. All measurements were done for incident 1095-nm light.

FIG. 12 shows multipolar spectral decomposition of the nanohelix scattering cross section. The curves correspond to the electric dipole (ED), magnetic dipole (MD), electric quadrupole (EQ) and magnetic quadrupole (QD), as well as the total scattering cross section, upon illumination with right- and left-circularly polarized light (LCP and RCP, respectively). The circular difference (CD) corresponds to the difference (Δ) in scattering cross section.

To assess the contribution of the solvent to the third harmonic scattering (TH) signal, experiments were performed in the forward and 90° emission with a liquid media comprising 0.2% of sodium dodecyl sulfate (SDS) in aqueous media (water). FIG. 13A shows the TH intensity measured as a function of laser power for incident left circularly polarized (LCP) and right circularly polarized (RCP). A schematic of the experimental setup is provided in the inset in FIG. 13A. Clearly, there is no TH forward emission from the solvent. FIG. 13B shows TH intensity as a function of incident laser power, for 0.2% SDS illuminated with LCP and RCP light. Clearly, there is no TH scattering from the solvent. The inset in FIG. 13B shows a schematic of the setup for measuring TH emission at a right angle. In both plots, the samples were illuminated with 1095-nm light.

The lines represent linear fits to $y=Ax+B$. For LCP, the coefficients A and B are $10^{-3}$ and $3\times10^{-2}$, respectively. For RCP, these coefficients are $-6.1\times10^{-3}$ and $5.6\times10^{-2}$, respectively. Therefore, it can be concluded that the contributions from the solvent to our results are negligible. FIG. 13B shows the TH intensity, emitted at a right angle, from the SDS. The figure is organized similarly to FIG. 10A. For LCP, the coefficients A and B are $-1.1\times10^{-2}$ and $4.4\times10^{-2}$. For RCP, these coefficients are $2.4\times10^{-3}$ and $-5.8\times10^{-2}$, respectively. Therefore, again, the contributions from the solvent to the results are negligible. These results unambiguously demonstrate that the TH results are due to the nonlinear optical properties of CdTe nanohelices.

Assessment of third harmonic scattering/generation—10 mm cuvette interfaces. All of the samples are measured in fused quartz cuvettes. Symmetry breaking at interfaces can lead to strong nonlinearities. Therefore, it is assessed if TH generation at the air/quartz, quartz/solvent, solvent/quartz, and quartz/air interfaces is contributing to the TH intensity measured.

TH intensity measured in the forward scattering configuration for various positions of the focusing lens is presented in FIGS. 14A-14B. For incident linearly polarized light, four peaks of TH intensity are observed. These peaks correspond to the four interfaces of the cuvette. The peaks are narrow so there is no contribution from the interfaces when the focusing lens is positioned between approximately 86 mm and 92 mm. For incident LCP light, the TH intensity generated at the interfaces of the cuvette is much lower than for linearly polarized light. In the measurements of CdTe nanohelices, the incident light is circularly polarized and the focusing lens is positioned at 89.5 mm, which is clearly far from any interfaces. Therefore, there is no contribution from TH generation at the glass interfaces in any of the measurements. To confirm this observation, a power dependence measurement with an empty cuvette is presented in FIG. 14B. The full circles and triangles correspond to LCP and RCP illumination, respectively. The lines are fit to the equation $y=Ax+B$. For LCP, the A and B coefficients are $-4.1\times10^{-4}$ and $3.3\times10^{-3}$, respectively. For RCP, the A and B coefficients are $1.1\times10^{-3}$ and $-2.3\times10^{-2}$, respectively. Therefore, the contributions from the glass interfaces are negligible.

Moreover, the results in FIG. 14B are important because they demonstrate that there is no TH generation from any of the optical components in the setup, regardless of illumination power. Additionally, these same results show that the detector is not being affected by any outside light sources, such as instrument LEDs and displays within the lab.

Next, testing is conducted for the presence of optical rotation. FIG. 15A shows a schematic diagram of the setup. The fundamental is linearly polarized along the vertical (S) direction. The quarter-wave plate is not removed to avoid significant changes to the setup; however, it is set with its fast-axis parallel to the direction of incident polarization. An analyzing polarizer (analyzer) is placed on a rotation stage before the detector. The angular position of 90° corresponds to the vertical direction of polarization. Then, the third harmonic signal is measured as a function of analyzer angle. For both chiral forms of the samples, the data are shown in FIG. 15B. As can be seen, the third harmonic light is vertically polarized and there is no measurable optical rotation.

Third harmonic scattering/generation at 1 mm cuvette interfaces is assessed in FIG. 16. More specifically, FIG. 16 shows TH intensity as a function of the position of the focusing lens for illumination with linearly and left circularly polarized (LCP) 1095-nm light (incident power=15 mW). Measurements were done in the forward scattering geometry. No third harmonic (TH) light is observed from the 1 mm cuvette interfaces.

FIGS. 17A-17D show third harmonic hyper Mie scattering optical activity at 1065 nm and 1125 nm, when samples are measured in a cuvette with a 1-mm path-length. Measurements of TH intensity as a function of power for the ∧-CdTe and Δ-CdTe nanohelices placed in cuvettes with 1-mm path-length are presented in FIGS. 17A-17D. These power dependence curves were used to calculate the ellipticities in FIG. 5A.

Figures 5A, 5B, 5C, 5D, 5E:
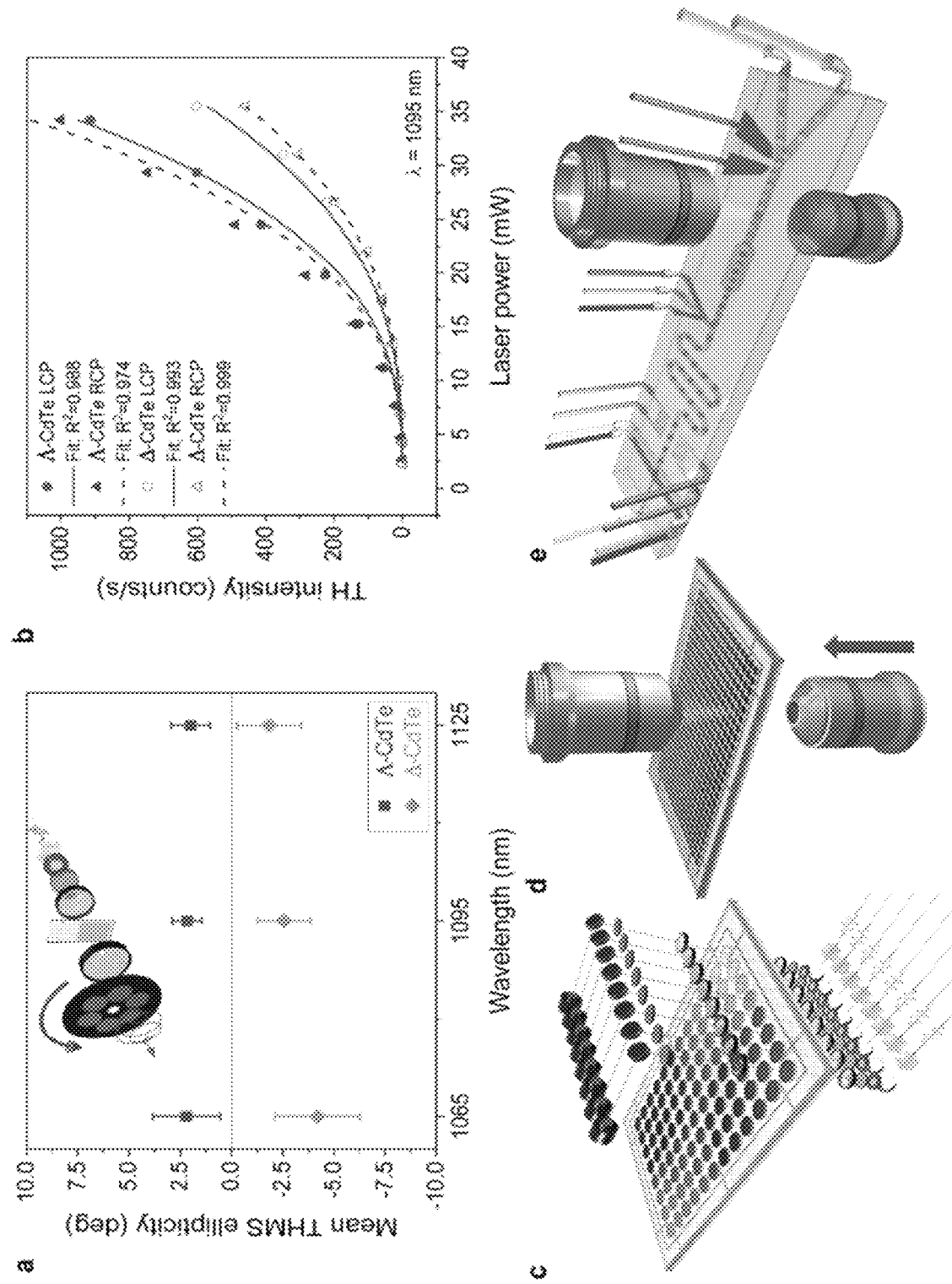

FIGS. 5A-5E show applications of THMS for characterizing chiral nanostructures in ultrasmall volumes. FIG. 5A shows proof-of-principle data showing that methods according to certain aspects of the present disclosure can clearly differentiate ∧-CdTe and Δ-CdTe, in 1 mm thick optical cuvettes (as opposed to standard 1 cm cells). The THMS ellipticity was calculated from power dependence curves measured at three different wavelengths. FIG. 5B shows, in the same 1 mm cuvette, the TH intensity follows a clear cubic dependence as a function of laser power at the wavelength of 1095 nm. Despite the small dimensions of the cuvette, the chiroptical effect for LCP and RCP, respectively, clearly reverses sign with the handedness of the samples, illustrating the potential for applications in tiny volumes. FIG. 5C shows a schematic diagram illustrating an application of the technique according to certain aspects of the present disclosure as analysis tool in parallel combinatorial chemical synthesis. FIG. 5D shows scanning the laser beam in an optical objective could allow applications for high throughput experimentation—to scope reaction conditions, which generate nanomolar quantities of the desired compound in minuscule volumes (e.g., <1 µL) arrayed across a microplate. The red arrow indicates the direction of incident light. FIG. 5E shows a schematic illustration for in-line reaction monitoring within microreactors.

These examples thus demonstrate the fundamental ability of non-linear chiroptical activity for Mie scattering, represented by THMS. As assessed above, contributions from THG, multiphoton luminescence and supercontinuum generation were carefully ruled out, and this effect was observed for semiconductor CdTe nanohelices at three different wavelengths. The magnitude of THMS is large displaying TH ellipticity approximately 3° from an illumination volume as small as $V_{focus}$ of approximately $4.56 \times 10^{-14}$ m$^3$. In agreement with physics of Mie scattering, the effect is highly directional, with approximately 10 times more TH light detected in the forward direction, compared to sideways. Whereas the TH emission in the forward direction is circularly polarized, in the right angle direction it is linearly polarized (vertically). In both cases, a clear chiroptical response is observed, with a sign reversal. The sign reversal indicates that emission in the forward direction and at the right angle is due to different sets of TH effective susceptibility tensor components, whereby the phase between the chiral and achiral part changes sign, depending on the direction of emission. These results open the way for chiroptical characterization of semiconductor and other chiral non-metallic particles in volumes potentially of the order of $10^{-17}$ m$^3$. The ability to evaluate such miniaturized reaction volumes offers a technological link between chemical synthesis and data science requirements exploration of chiral nanostructures. Furthermore, it can be potentially extended to chiral nanostructured particles with multiscale organization and similar dimensions, such as extracellular vesicles, which are widely investigated nowadays for cancer detection. Being labeled with inorganic nanoparticles, high THMS intensity offers a pathway to detect and digitize the presence of rare extracellular vesicles with microfluidics.

The present disclosure thus contemplates use of chiroptical spectroscopies to provide a new optical dimension and informative datasets for structural analysis of nanostructured particles. They can be utilized in robotic optimization of nanophotonic materials, but these spectroscopies typically require sample volumes incompatible with generating large chemical libraries. These new optical tools can characterize chirality for ultrasmall volumes, such as 1 µL droplets, needed for high-throughput synthetic and analytical stations for chiral compounds. It has been shown experimentally that a novel photonic effect enabling such capabilities —third harmonic Mie scattering (THMS) optical activity is observed for suspensions of CdTe nanostructured helices, in volumes several orders of magnitude smaller than 1 µL. Chiroptical third harmonic emission was recorded when CdTe helices were illuminated with 1065, 1095 and 1125 nm laser beams and the THMS intensity was approximately 0 times higher in the forward direction than sideways. The third harmonic ellipticity was as high as approximately 3° and this is attributed to the effect of the interference of chiral and achiral effective nonlinear susceptibility tensor components. THMS on semiconductor helices thus provides the ability for rapid high-throughput chiroptical characterization of sample volumes as small as $10^{-5}$ µL.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of detecting chiral properties from a sample, the method comprising:
   directing light towards a sample in contact with a chiral nanoparticle; and
   detecting third harmonic Mie scattering (THMS) optical activity generated by the chiral nanoparticle in contact with the sample.

2. The method of claim 1, wherein the third harmonic Mie scattering (THMS) optical activity is a third harmonic (TH) emission in a forward direction that is circularly polarized.

3. The method of claim 1, wherein the sample has a volume of less than or equal to about 1 microliter.

4. The method of claim 1, wherein the sample has a volume of greater than or equal to about $10^{-5}$ microliters to less than or equal to about 1 microliter.

5. The method of claim 1, wherein the chiral nanoparticle comprises a semiconductor material.

6. The method of claim 1, wherein the chiral nanoparticle comprises cadmium tellurium (CdTe).

7. The method of claim 1, wherein the chiral nanoparticle comprises a plurality of chiral nanoparticles self-assembled together to define at least one self-assembled nanostructured helix.

8. The method of claim 1, wherein the chiral nanoparticle comprises a plurality of chiral nanoparticles assembled together, wherein each chiral nanoparticle is in the form of a nanohelix having a length of greater than or about 5 micrometers to less than or equal to about 8 micrometers and a thickness of greater than or equal to about 10 nm to less than or equal to about 50 nm.

9. The method of claim 1, wherein the light is circularly polarized light.

10. A device for detecting chiral properties of a sample, the device comprising:
    at least one microwell having a volume of less than or equal to about 1 microliter configured to hold a chiral nanoparticle capable of generating third harmonic Mie scattering (THMS) optical activity and a sample to be analyzed;
    a source of light configured to generate and direct light toward the at least one microwell containing the chiral nanoparticle and the sample; and at least one detector configured to detect third harmonic Mie scattering (THMS) generated by the chiral nanoparticle in the at least one microwell.

11. The device of claim 10, wherein the chiral nanoparticle is provided in the sample in the microwell.

12. The device of claim 10, wherein the chiral nanoparticle is associated with a surface of the microwell.

13. The device of claim 10, wherein the microwell has a volume of greater than or equal to about $10^{-5}$ microliters to less than or equal to about 1 microliter.

14. The device of claim 10, wherein the chiral nanoparticle comprises a semiconductor material.

15. The device of claim 10, wherein the chiral nanoparticle comprises cadmium tellurium (CdTe).

16. The device of claim 10, wherein the chiral nanoparticle comprises a plurality of chiral nanoparticles self-assembled together to define at least one self-assembled nanostructured helix.

17. The device of claim 10, wherein the chiral nanoparticle comprises a plurality of chiral nanoparticles assembled together, wherein each chiral nanoparticle is in the form of a nanohelix having a length of greater than or equal to about 5 micrometers to less than or equal to about 8 micrometers and a thickness of greater than or equal to about 10 nm to less than or equal to about 50 nm.

18. The device of claim 10, wherein the source of light is configured to generate and direct circularly polarized light.

19. The device of claim 10, wherein the at least one microwell comprises an array of microwells.

* * * * *

UNITED STATES PATENT AND TRADEMARK OFFICE
CERTIFICATE OF CORRECTION

PATENT NO. : 12,216,043 B2  
APPLICATION NO. : 18/715339  
DATED : February 4, 2025  
INVENTOR(S) : Nicholas A. Kotov et al.

It is certified that error appears in the above-identified patent and that said Letters Patent is hereby corrected as shown below:

On the Title Page

At page 2, Column 1, Item (57) Abstract, Line number 2, delete "Nat" and insert --at--.

Signed and Sealed this  
Twenty-fifth Day of March, 2025

Coke Morgan Stewart  
*Acting Director of the United States Patent and Trademark Office*